United States Patent
Yoshino et al.

(10) Patent No.: US 12,464,621 B2
(45) Date of Patent: Nov. 4, 2025

(54) LIGHT SOURCE DEVICE

(71) Applicant: Mitsubishi Electric Corporation, Tokyo (JP)

(72) Inventors: Hiroyuki Yoshino, Tokyo (JP); Tomokazu Sakashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 95 days.

(21) Appl. No.: 18/269,986

(22) PCT Filed: Jan. 22, 2021

(86) PCT No.: PCT/JP2021/002208
§ 371 (c)(1),
(2) Date: Jun. 28, 2023

(87) PCT Pub. No.: WO2022/157917
PCT Pub. Date: Jul. 28, 2022

(65) Prior Publication Data
US 2024/0074017 A1 Feb. 29, 2024

(51) Int. Cl.
*H05B 45/48* (2020.01)
*H05B 45/10* (2020.01)

(52) U.S. Cl.
CPC ............ *H05B 45/48* (2020.01); *H05B 45/10* (2020.01)

(58) Field of Classification Search
CPC ...... H05B 45/48; H05B 45/10; H05B 45/325; Y02B 20/40
See application file for complete search history.

(56) References Cited

U.S. PATENT DOCUMENTS

| | | | |
|---|---|---|---|
| 9,398,656 B2 * | 7/2016 | Gray | H05B 45/48 |
| 2017/0008447 A1 * | 1/2017 | Fukui | B60Q 1/0094 |
| 2019/0202344 A1 * | 7/2019 | Maruyama | H05B 47/10 |
| 2020/0187327 A1 | 6/2020 | Ichikawa | |

FOREIGN PATENT DOCUMENTS

| | | | |
|---|---|---|---|
| JP | 2009134933 A | * | 6/2009 |
| JP | 2020-095816 A | | 6/2020 |
| WO | 2018/047915 A1 | | 3/2018 |

OTHER PUBLICATIONS

International Search Report and Written Opinion mailed on Apr. 6, 2021, received for PCT Application PCT/JP2021/002208, filed on Jan. 22, 2021, 10 pages including English Translation.

* cited by examiner

*Primary Examiner* — Minh Tran
(74) *Attorney, Agent, or Firm* — XSENSUS LLP

(57) ABSTRACT

At least one light source unit includes light sources which are series connected, switches which are each connected in parallel with each of the light sources, a light source drive circuit which supplies a current to a structure including the light sources and the switches, and switch control means which carries out on and off control of the switches. Based on light source control information, the light source unit carries out light dimming control of the light sources by performing on and off of the switches, according to a light turned on duty ratio. In addition, each of the light sources is sequentially light turned on from the one with a larger light on duty ratio, and in addition, each of the light sources is sequentially light turned off from the one with a smaller light on duty ratio source.

11 Claims, 21 Drawing Sheets

LIGHT SOURCE DEVICE

CROSS-REFERENCE TO RELATED APPLICATION

The present application is based on PCT filing PCT/JP2021/002208, filed Jan. 22, 2021, the entire contents of which are incorporated herein by reference.

TECHNICAL FIELD

The present application relates to a light source device.

BACKGROUND ART

Light source devices, which are each configured by combining LED (Light Emitting Diode) light sources and a light source drive circuit for driving these LED light sources, are used as the head lights for an automobile. In particular, from a viewpoint of energy saving, LED light sources are adopted as the light sources of a head light for an automobile.

LED light sources will be light turned on, when current is supplied from a light source drive circuit. Moreover, a plurality of LED light sources is connected in series, and a bypass switch is provided in parallel with each of the LED light sources which are connected in series. The light source drive circuit carries out on and off control of these bypass switches, and thereby, the light dimming of LED light sources and their partial light turned off are carried out. Then, the function to achieve various patterns in luminous intensity distribution is mounted in the light source device.

According to the on and off control state of the bypass switches, the equivalent in-series number of LED light sources, which is observed from the light source drive circuit, changes. In order to light turn on the LED light sources at a desired light volume and also at a desired pattern in luminous intensity distribution, it is necessary to apply a required total forward voltage m×Vf, from a light source drive circuit, according to m, the equivalent series connected number of the mentioned above LED light sources.

When the voltage VIN of an input power supply to the mentioned above light source drive circuit falls, the required forward voltage m×Vf cannot be applied from the mentioned above light source drive circuit, and then, it is probable that the luminance of the LED light sources is lowered, or the light turned off of the LED light sources is caused.

Then, technology for a light turned on circuit and a vehicle use light turned on implement is proposed (Patent Document 1), in which the light turned off of LED light sources is prevented by controlling the bypass switches according to the situation of the voltage VIN. When this proposed technology is used, it becomes possible to obtain a desired pattern in luminous intensity distribution, even in a case where the voltage VIN falls.

CITATION LIST

Patent Literature

Patent Document 1: Japanese Laid-Open Patent Publication No. 2020-95816

SUMMARY OF THE INVENTION

Technical Problem

According to the proposed technology, however, when a light source device controls at least two LED light sources, among the mentioned above plurality of in-series LED light sources, at each different light turned on duty ratio and generates a pattern in luminous intensity distribution, the pattern in luminous intensity distribution is highly restricted, and there remains a subject that unstable light turned on is caused due to a decrease in voltage.

The present application is made in response to the mentioned above subject, which is owned by the conventional technology. In addition, the present application aims at offering a light source device which can prevent the light turned off of LED light sources owing to a voltage drop, without restraining a pattern in luminous intensity distribution, even when at least two LED light sources are controlled at each different light turned on duty ratio, among the mentioned above plurality of in-series LED light sources.

Solution to Problem

A light source device according to the present application includes:
  an electric power unit which outputs a voltage with a predetermined value in response to an output of an external power supply, and
  at least one light source unit,
  wherein the at least one light source unit comprises: light sources which are series connected, switches which are each connected in parallel with each of the light sources, a light source drive circuit which supplies a current to a structure including the light sources and the switches, in response to output electric power from the electric power unit, and a switch control circuit which carries out on and off control of the switches,
  wherein the at least one light source unit carries out light dimming control of the light sources by performing on and off of the switches, according to a light turned on duty ratio,
  at least two of the light sources have a mutually different light turned on duty ratio, and
  each of the light sources is sequentially light turned on from the one with a larger light turned on duty ratio, and in addition, sequentially light turned off from the one with a smaller light turned on duty ratio.

Advantageous Effects of the Invention

According to the light source device of the present application, even when controlling at least two of the light sources, at each different light turned on duty ratio, it becomes possible, without restraining a pattern in luminous intensity distribution, to achieve the stable light turned on, where the light turned off of the light sources due to a voltage drop is prevented.

DESCRIPTION OF EMBODIMENTS

Embodiment 1

Figure 1:
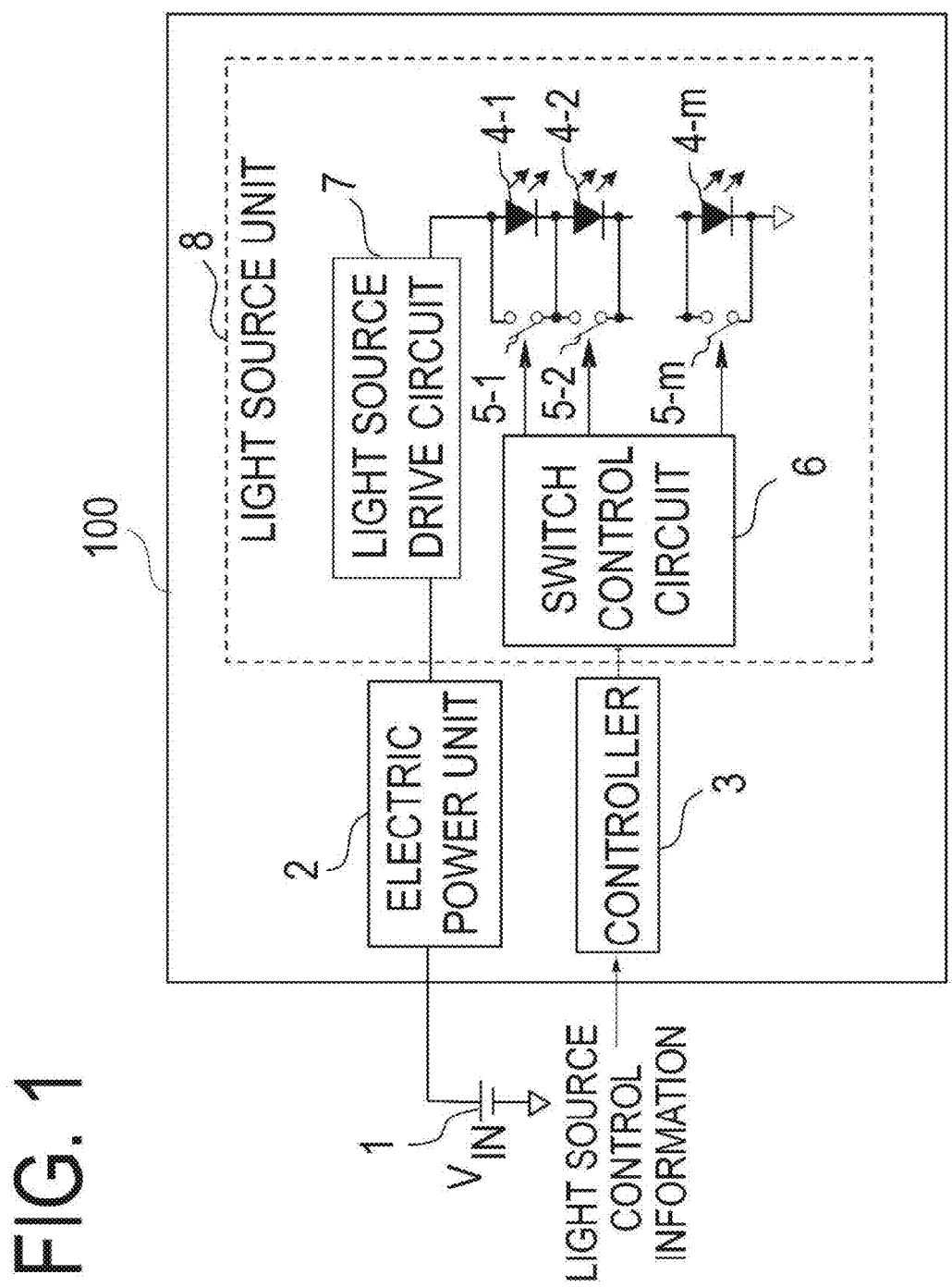
FIG. 1 is a configuration diagram of a light source device, according to the Embodiment 1.

FIG. 1 is a configuration diagram for showing the constitution of a light source device, which includes a light source drive circuit, driving LED light sources. Hereinafter, a case will be explained in which LED light sources are used for the headlight of a car.

As shown in FIG. 1, the light source device 100 according to the Embodiment 1 has an electric power unit 2 which receives a voltage VIN1 of an input voltage source 1 (external power supply) as an input, and outputs a voltage of a predetermined value; and a controller 3 which outputs a switch control signal based on light source control information. In the light source device 100, a light source unit 8 is constituted of: LED light sources 4 (from 4-1 to 4-m, where m=1, 2, 3, and 4, and the same is true for henceforth) which are connected in series; switches 5 (5-1 to 5-m) which are each connected in parallel with each of the light sources 4; a switch control circuit 6 which carries out on and off control of each of the switches 5 (5-1 to 5-m), based on a switch control signal which the controller 3 outputs, and a light source drive circuit 7 which receives the output of the electric power unit 2 as an input, and supplies current to the plurality of LED light sources 4. Here, as an example of the light source control information, control information for a light source device which is used for the headlight of a car is given. According to the control information, when an oncoming car is detected by a camera or a sensor, only a specific LED light source, among a plurality of LED light sources, is light turned off, so that a portion of the oncoming car may not be irradiated by light.

Explanation will be made, as an example, about a case in which the input voltage source 1 according to the Embodiment 1 is a battery of car use. A voltage VIN1 is output from the input voltage source 1. As shown in FIG. 1, the LED light source 4 according to the Embodiment 1 is constituted of a plurality of LED light sources, which are connected in series. Moreover, in the following descriptions, explanation will be made, as an example, about a case in which the number of LED light sources is four (m=4).

Figure 2:
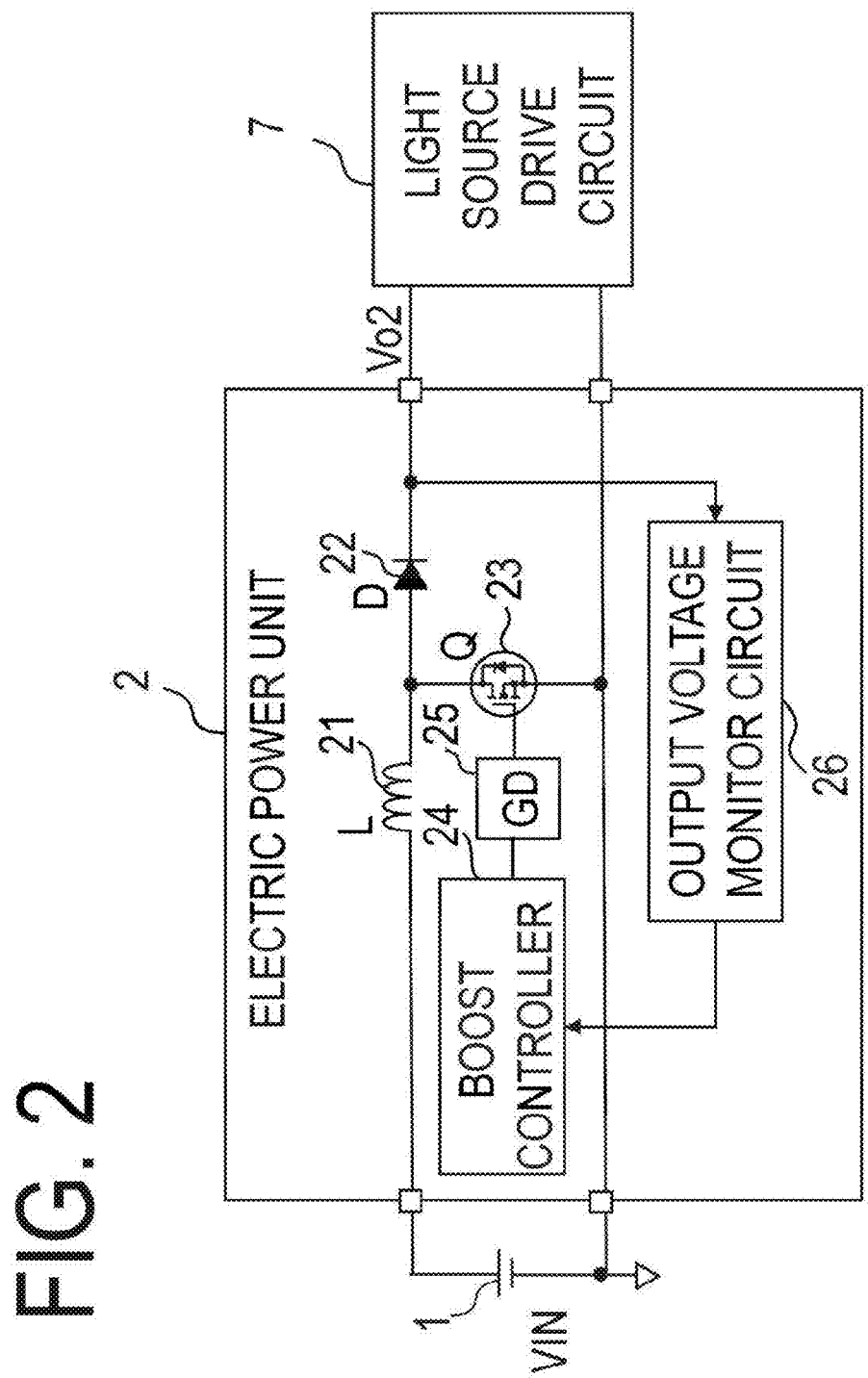
FIG. 2 is a configuration diagram of an electric power unit, according to the Embodiment 1.

The electric power unit 2 according to the Embodiment 1 is constituted of a boost chopper, which is illustrated in FIG. 2. As shown in FIG. 2, the main circuit of the boost chopper consists of an inductor 21 (L), a diode 22 (D), and a switching element 23 (Q). It is worth noticing that, in FIG. 2, the switching element 23 (Q) is illustrated as a MOSFET (Metal Oxide Semiconductor Field Effect Transistor). It is, however, allowed that this switching element 23 is a TRANSISTOR, an IGBT (Insulated Gate Bipolar Transistor), and the like. Moreover, although the switching element of asynchronous rectification type is illustrated in FIG. 2, it is allowed to employ the synchronous rectification type.

The boost chopper, which is shown in FIG. 2, inputs a pulse modulation signal (PWM2), such as PWM (Pulse Width Modulation), which is output from a boost controller 24, into the gate terminal of the switching element 23 (Q) through a gate driver 25 (GD), and performs switching control. The output voltage monitor circuit 26 monitors an output voltage value Vo2 of the boost chopper, and feeds back a voltage monitor signal VoM2 to the boost controller 24. On the basis of the difference value between a predetermined output voltage target value VT2 and the voltage monitor signal VoM2, the boost controller 24 controls the duty ratio of a pulse modulation signal PWM2, so that the output voltage value Vo2 of the boost chopper may approach a target voltage value. In this way, the input voltage VIN1 which is input into the boost chopper is output from the electric power unit 2, as an output voltage value Vo2 which is larger than the input voltage VIN1, according to the output voltage target value VT2.

It is worth noticing that, in FIG. 2, illustrated is a boost chopper of voltage mode type, in which only an output voltage value Vo2 is monitored to control the switching element 23 (Q). It is allowed, however, to employ a peak current mode type or an average current mode type or the like, in which current flowing into the inductor 21 (L), the switching element 23 (Q), and the like is also monitored simultaneously to control the switching element 23 (Q).

Moreover, the electric power unit 2 in the Embodiment 1 is not limited to a boost chopper, and, any type of constant voltage output source having a boost function may be used as an electric power unit. For example, a boost and step-down chopper, a fly back converter, a H type boost and step-down converter, a SEPIC (Single-Ended Primary-Inductance Converter), and the like can be used.

Figure 3:
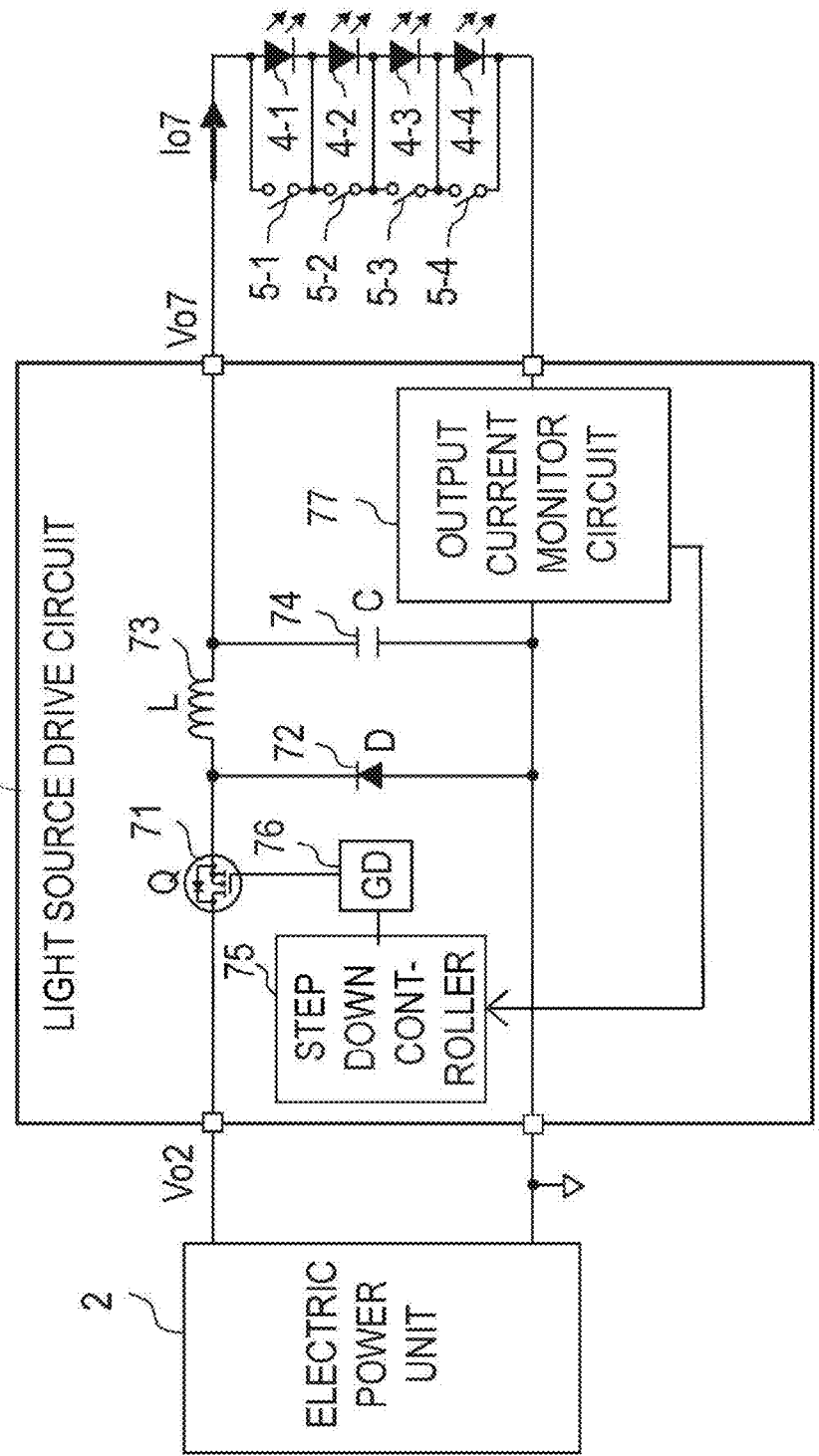
FIG. 3 is a configuration diagram of a light source drive circuit, according to the Embodiment 1.

The light source drive circuit 7 according to the Embodiment 1 consists of a step-down chopper, which is illustrated in FIG. 3. As illustrated in FIG. 3, the main circuit of a step-down chopper is composed of a switching element 71 (Q), a diode 72 (D), an inductor 73 (L), and a capacitor 74 (C). As mentioned above, the switching element 71 (Q) is not limited to a MOSFET. Further, a TRANSISTOR, an IGBT, and the like may be employed. Moreover, the step-down chopper may be the one of synchronous rectification type.

The step-down chopper which is illustrated in FIG. 3 inputs a pulse modulation signal PWM7, such as PWM and the like, which is output from the step-down controller 75, into the gate terminal of the switching element 71 (Q) through the gate driver 76 (GD), and performs switching control. According to the on and off control state of each of the switches 5 (5-1 to 5-$m$), the output current Io7 of the step-down chopper is monitored in the output current monitor circuit 77, through the LED light sources 4 (4-1 to 4-$m$) or the switches 5 (5-1 to 5-$m$), which are loads. In addition, the output current monitor circuit feeds back a current monitor signal IoM7 to the step-down controller 75. It is worth noticing that, the location of the output current monitor circuit 77 is not limited to the one which is illustrated in FIG. 3, and any location will be accepted, as long as the output current Io7 can be monitored. For example, those locations include the one between a terminal at which the output voltage Vo7 of the step-down chopper is output and a LED light source 4 (4-1).

On the basis of the difference value between a predetermined output current target value IT7 and the current monitor signal IoM7, the step-down controller 75 controls the duty ratio of the pulse modulation signal PWM7, that is, the output voltage Vo7 of the step-down chopper, so that the output current Io2 of the step-down chopper may approach the target current value. According to the above descriptions, on the basis of the output voltage value Vo2 of the electric power unit 2, the step-down chopper, that is, the light source drive circuit 7 outputs a constant current Io7, in accordance with the output current target value IT7, to the LED light sources 4 (4-1 to 4-$m$) and the switches 5 (5-1 to 5-$m$), which are loads.

Figure 4:
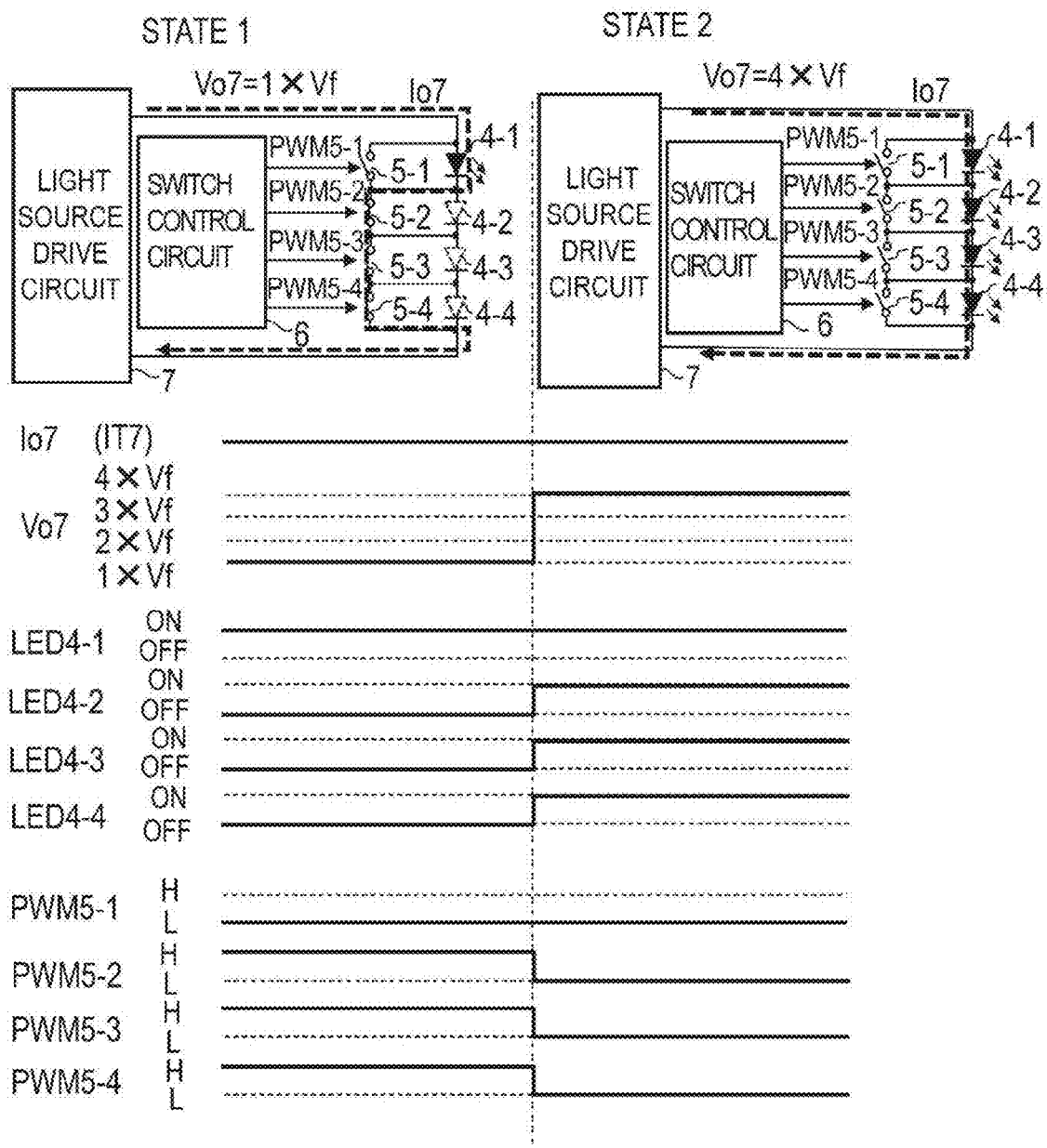
FIG. 4 is an explanatory diagram for showing the output states of switches and light sources, according to the Embodiment 1.

FIG. 4 shows an example of the relationship among the control signal PWMs (5-1 to 5-$m$) of the switches 5 (5-1 to 5-$m$), the light turned on states of the LED light sources 4 (4-1 to 4-$m$), and the voltage Vo7 and constant current Io7 which are output from the light source drive circuit 7.

It is assumed that the control signal PWMs (5-1 to 5-$m$) are signals which control the on and off of the switches 5 (5-1 to 5-$m$). In addition, it is also assumed that the switch will be turned off at LOW level (henceforth, referred to as L level), and the switch will be turned on at HIGH level (henceforth, referred to as H level).

Like the example which is shown in State 1 of FIG. 4, when the switches 5 (5-1 to 5-$m$) are off (PWM 5-$m$ is at L level), the constant current Io7 which is output from the light source drive circuit 7 flows into the LED light sources 4 (4-1 to 4-$m$). Then, the LED light sources 4 (4-1 to 4-$m$) will become a light turned on state. On the other hand, when the switches 5 (5-1 to 5-$m$) are on (PWM 5-$m$ is at H level), the constant current Io7 which is output from the light source drive circuit 7 flows into the switch 5-$m$. Then, the LED light sources 4 (4-1 to 4-$m$) will become a light turned off state.

In this way, the on and off state of the switches 5 (5-1 to 5-$m$) and the light turned on and light turned off state of the LED light sources 4 (4-1 to 4-$m$) are in a reverse logic relationship. Then, in order to prevent confusion, henceforth, in the explanation of Embodiments, an example of the drawing in which the light turned on state and the light turned off state of the LED light sources are focused on will be shown.

Here, when the constant current Io7 is made to flow, a forward voltage which is generated in each of the LED light sources 4 (4-1 to 4-$m$) is set to be Vf. Moreover, it is assumed that, when the constant current Io7 is made to flow, a potential difference which is generated in the on resistance of each of the switches 5 (5-1 to 5-$m$) can be neglected.

In the State 1 which is shown in FIG. 4, by the control of the switches 5 (5-1 to 5-$m$), a constant current Io7 flows in the following course: the LED light source 4-1, the switch 5-2, and the switch 5-3.

In this case, since the equivalent in-series number of LED light sources, which is observed from the light source drive circuit 7, is one, the output voltage value of the light source drive circuit 7 becomes Vo7=1×Vf. On the other hand, in the State 2 which is shown in FIG. 4, by the control of the switches 5 (5-1 to 5-$m$), a constant current Io7 flows in the following course: the LED light source 4-1, the LED light source 4-2, the LED light source 4-3, and the LED light source 4-4.

In this case, since the equivalent in-series number of LED light sources, which is observed from the light source drive circuit 7, is four, the output voltage value Vo7 of the light source drive circuit 7 becomes Vo7=4×Vf.

Figure 5:
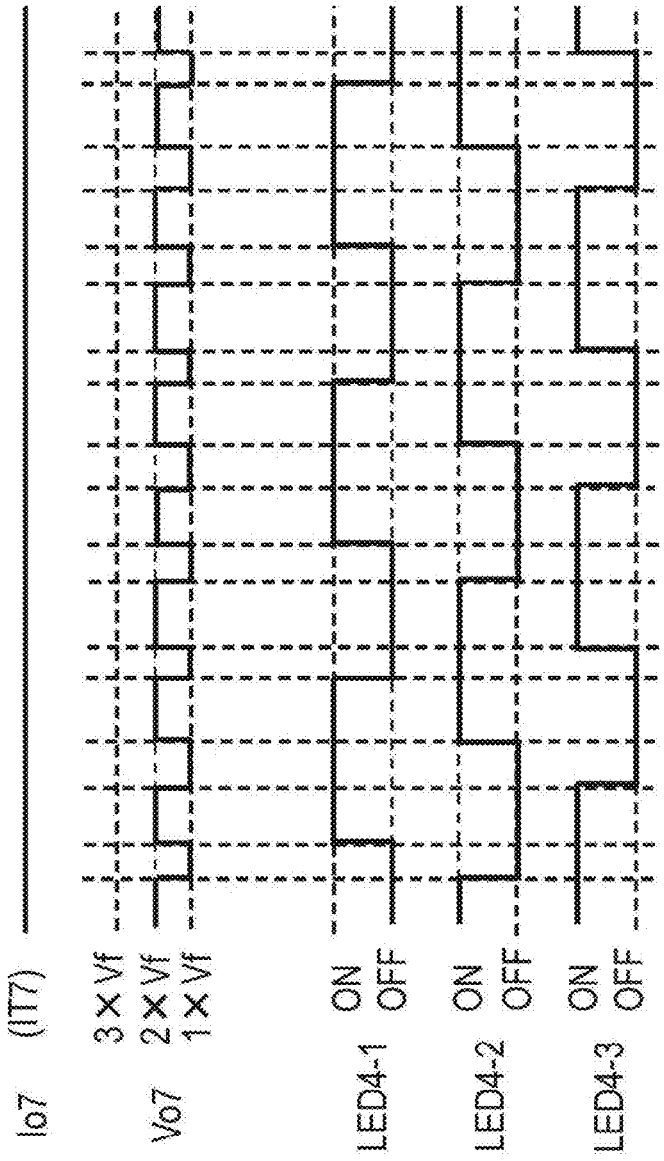
FIG. 5 is an explanatory diagram of control signals according to the comparative example, with respect to the Embodiment 1.

In FIG. 5, shown is a comparative example in the case of a control signal PWM 5-$m$. In this comparative example, the voltage from an input voltage source VIN1, that is, from the battery of car use, is directly input into the light source drive circuit 7.

As shown in FIG. 5, in the comparative example, a case is shown in which the number of LED light sources is m=3. Moreover, in the comparative example, it is assumed that each control signal PWM 5-$m$ has the same duty ratio. As shown in FIG. 5, while there are three LED light sources in the comparative example, the phase of the control signal PWM 5-$m$ is each shifted, so that the equivalent maximum in-series number of LED light sources, which is observed from the light source drive circuit 7, becomes two or less (the voltage Vo7 is below 2×Vf).

By employing the configuration mentioned above, also even when the input voltage source VIN1 falls below 3×Vf, it become possible to prevent the reduction in the light volume of LED light sources and their light turned off, if there exists a voltage larger than 2×Vf. Moreover, by further adjusting the duty ratio according to the state of the input voltage VIN, a desired pattern in luminous intensity distribution can be obtained.

However, when at least two LED light sources are controlled at each different light turned on duty ratio by the switches 5 (5-1 to 5-$m$), to generate a pattern in luminous intensity distribution, the pattern in luminous intensity distribution is highly restricted, if the state where all the LED light sources are in a full light turned on state (in the example of FIG. 5, a state where the voltage Vo7 becomes 3×Vf) is avoided. Then, the desired stable light turned on cannot be achieved. Moreover, in the example of FIG. 5, when the input voltage source VIN1 falls below 2×Vf, it is not possible to prevent the reduction in the light volume of LED light sources and their light turned off, and then, stable light turned on cannot be achieved.

On the other hand, in the Embodiment 1 of the present application, the mentioned above electric power unit 2 is provided, and thereby, the input voltage source VIN1 can be boosted. In addition, when the number of LED light sources is m, the light source drive circuit outputs a voltage which is sufficiently higher than m×Vf, as the output voltage value Vo2 of the electric power unit 2. Thereby, the light turned off of the LED light sources can be prevented. However, when the output voltage value Vo2 of the electric power unit 2 is set to be much higher than m×Vf, the efficiency will fall, and this may lead to a larger size and higher cost in the circuit.

As one of the methods for improving the efficiency of the electric power unit 2, there is a method in which the output voltage value Vo2 is set as an output voltage value Vo2, which is somewhat higher than m×Vf (for example, with respect to m×Vf, a voltage higher than 1V to several Vs). However, when the input voltage source VIN1 which is the input of the electric power unit 2 is the battery of car use, it is necessary to take into consideration the wide range variation in input voltage, of about 6V to 18V.

Furthermore, as for the LED light sources 4 (4-1 to 4-m) or the switches 5 (5-1 to 5-m) which are loads, the equivalent in-series number of LED light sources, which is observed from the light source drive circuit 7, changes every moment, as mentioned above, according to the control state of the switch 5. Therefore, it is necessary to take into consideration the wide range of variation in the amount of current which is output from the electric power unit 2.

As mentioned above, as for the electric power unit 2, it is necessary to take into consideration the wide range of variation both in an input voltage and an output current. When stable negative feedback control is performed under the basis of such restrictions, it is generally difficult to have a high upper limit frequency (zero crossing frequency of a loop gain) FBW at a response frequency band. Therefore, when the output voltage value Vo2 of the electric power unit 2 is set to be the one somewhat higher than m×Vf, in order to improve the efficiency, the constant voltage control of the output voltage value Vo2 cannot keep up with fast load fluctuations. In addition, there is a case in which the output voltage value becomes below m×Vf, and stable light turned on cannot be achieved.

Then, according to the present Embodiment 1, the mentioned above subject will be solved as follows: In a plurality of LED light sources inside the mentioned above light source unit, the light dimming control of at least two light sources is carried out at each different light turned on duty ratio. In this case, after providing the mentioned above electric power unit 2, those LED light sources are sequentially light turned on from the one with a larger light turned on duty ratio, and furthermore, sequentially light turned off from the one with a smaller light turned on duty ratio.

Figure 6:
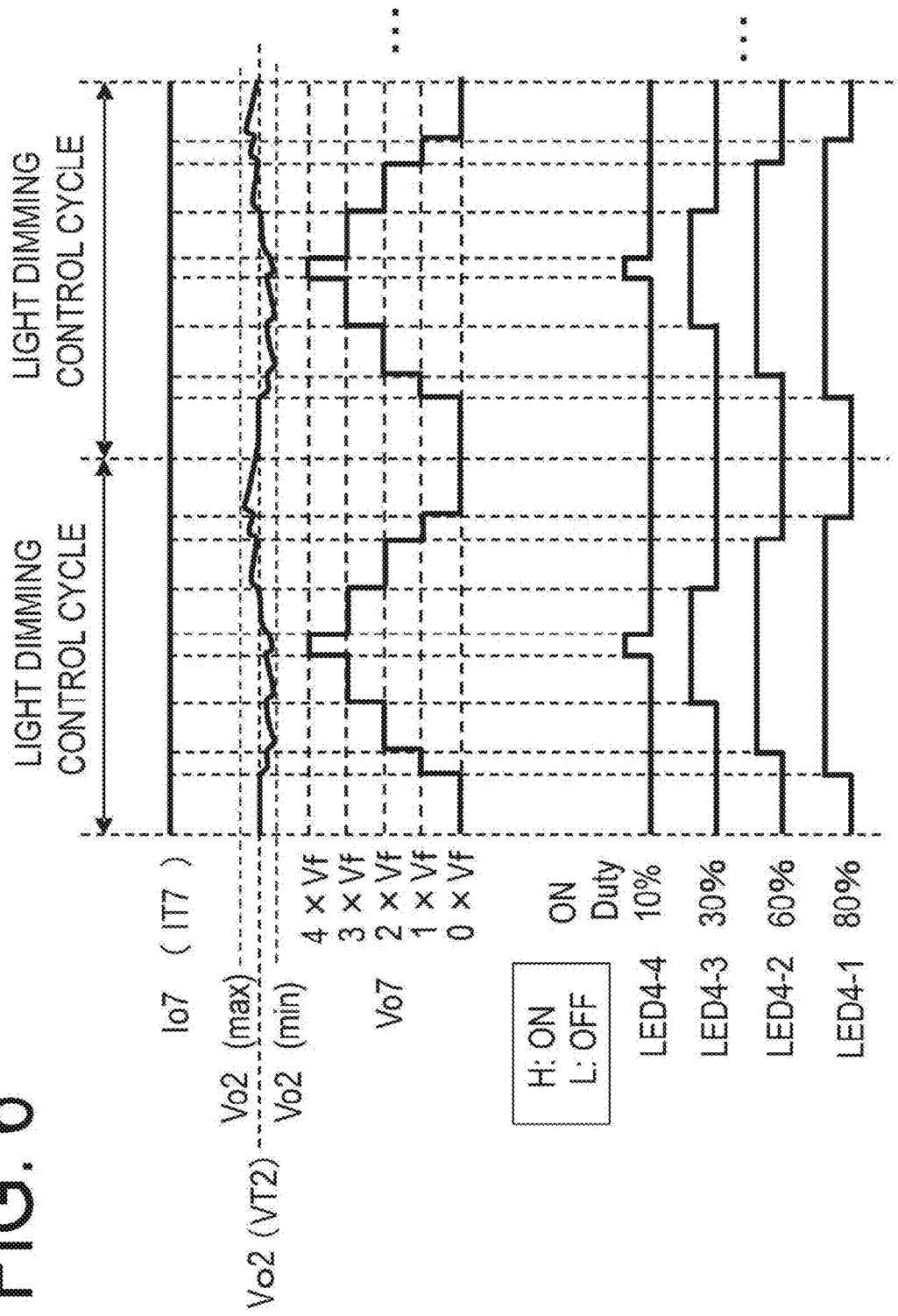
FIG. 6 is an operation explanatory diagram, according to the Embodiment 1.

FIG. 6 is an explanatory diagram of the control example in the Embodiment 1. In FIG. 6, explanation will be made, as an example, about a case in which, m, the number of LED light sources 4, is four (m=4), and those LED light sources 4 are controlled at each different light turned on duty ratio (their ratios are 10%, 30%, 60%, and 80%).

In FIG. 6, the target voltage of an output voltage value Vo2 in the electric power unit 2 is set to be a voltage larger than 4×Vf by several voltages or so. It is assumed that, comparatively, the output voltage value Vo2 and the voltage 4×Vf, which is required in the LED light sources, are close values. Moreover, in FIG. 6, when all of the LED light sources are light turned off, the output voltage value Vo2 is expressed as 0×Vf, for convenience. It is assumed that, however, in fact, since a potential difference is generated by the on-resistance of the switch 5-m, the output voltage value will not become zero V. Furthermore, as an example, a case is illustrated in FIG. 6, in which the light dimming control starts from the period when the simultaneously light turned on number of LED light sources is the smallest, in the light dimming control cycle of LED light sources. The start timing in the light dimming control is, however, not limited to the example of FIG. 6.

As illustrated in FIG. 6, four of the LED light sources 4 are sequentially light turned on from the one with a lager light turned on duty ratio, and furthermore, sequentially light turned off from the one with a smaller light turned on duty ratio. According to such a control, even when controlling each of the LED light sources at each different light turned on duty ratio, design flexibility in the pattern of light turned on duty ratios is high, and the design can be made easily without restrictions. However, it is required that the subject about the response frequency band of the mentioned above electric power unit 2, and in addition, the subject regarding the drop of efficiency due to the high output voltage may be solved.

In the present Embodiment 1, LED light sources are, at first, sequentially light turned on from the one with a larger light turned on duty ratio. Thereby, there can be a time difference between after a light turned on start time of the LED light sources, where the total light turned on number becomes one to three, and before a light turned on start time of the LED light sources, where the total light turned on number becomes four. In addition, the amount of current which is output from the electric power unit 2 can be increased in a stepwise manner. For that reason, even when the FBW of the electric power unit 2 is low, and furthermore, the output voltage value Vo2 is a voltage larger than 4×Vf by only several Vs or so, it becomes possible, by the light turned on start time of the fourth LED light source, to maintain or restore to a state in which a minimum output voltage value Vo2 (min), at the fluctuation time of the output voltage value Vo2, is higher than 4×Vf, within the range of the response frequency band of the electric power unit 2.

Therefore, at the light turned on time of a plurality of LED light sources, the voltage value of the output voltage value Vo2 is reduced to a minimum necessary value, and in addition, the efficiency of the electric power unit 2 can be improved. Further, the voltage drop due to the limitation at the response frequency band can be restrained, and the stable light turned on can be achieved, where light turned off is prevented.

Moreover, the LED light sources are sequentially light turned off from the one with a smaller light turned on duty ratio, and thereby, there can be a time difference between after a light turned off start time of the LED light sources, where the total light turned on number becomes from three to one, and before a light turned off start time of the LED light sources, where the total light turned on number becomes zero. In addition, the amount of current which is output from the electric power unit 2 can be decreased in a stepwise manner. For that reason, even when the FBW of the electric power unit 2 is low, the maximal output voltage value Vo2 (max) at the fluctuation time of the output voltage value Vo2 can be restrained to the lowest level, within the range of the response frequency band of the electric power unit 2.

Therefore, at the light turned off time of a plurality of LED light sources, the output voltage value Vo2 is reduced to a minimum necessary voltage value, and in addition, the maximum voltage at the time of fluctuations is restrained to the lowest level. Thereby, the efficiency of the electric power unit 2 can be improved As described above, even when at least two LED light sources are controlled at each different light turned on duty ratio, it becomes possible, without restraining a pattern in luminous intensity distribution, to achieve the stable light turned on, where the light turned off due to a voltage drop is prevented.

It is worth noticing that, as another effect, a case will be mentioned. For example, when the response control range of the light source drive circuit 7 is not enough, and the equivalent in-series number of the LED light source 4-m fluctuates at the control time of the switch 5-m, and further, even when it takes time to converge the output current Io7 of the light source drive circuit 7 on a target current value IT7, the maximum peak current value of the current Io7 at the of fluctuation time can be reduced. Then, it also becomes possible to prevent further the destruction of LED light sources.

Embodiment 2

Explanation will be made about the Embodiment 2 of the present application. It is worth noticing that, in each of the embodiments which are illustrated below, as for the element whose action or function is the same with that of the Embodiment 1, the symbol which is used in the explanation of the Embodiment 1 is used in the same manner, and detailed explanation of the element will be omitted appropriately. The same applies to the descriptions in the following embodiments. That is, as for the portion which is the same with or corresponding to in each of the drawings, the same symbol is given, and overlapping explanation will be omitted.

Like in the Embodiment 1, also in the Embodiment 2, the configuration which is illustrated in FIG. 1 is employed. In addition, explanation will be made, as an example, about a case in which, m, the number of LED light sources, is four (m=4). In the Embodiment 2, in contrast with the control of the Embodiment 1 which is illustrated in FIG. 6, in the light dimming control cycle of LED light sources, the light dimming control starts from the period when the simultaneously light turned on number of LED light sources is the largest.

Figure 7:
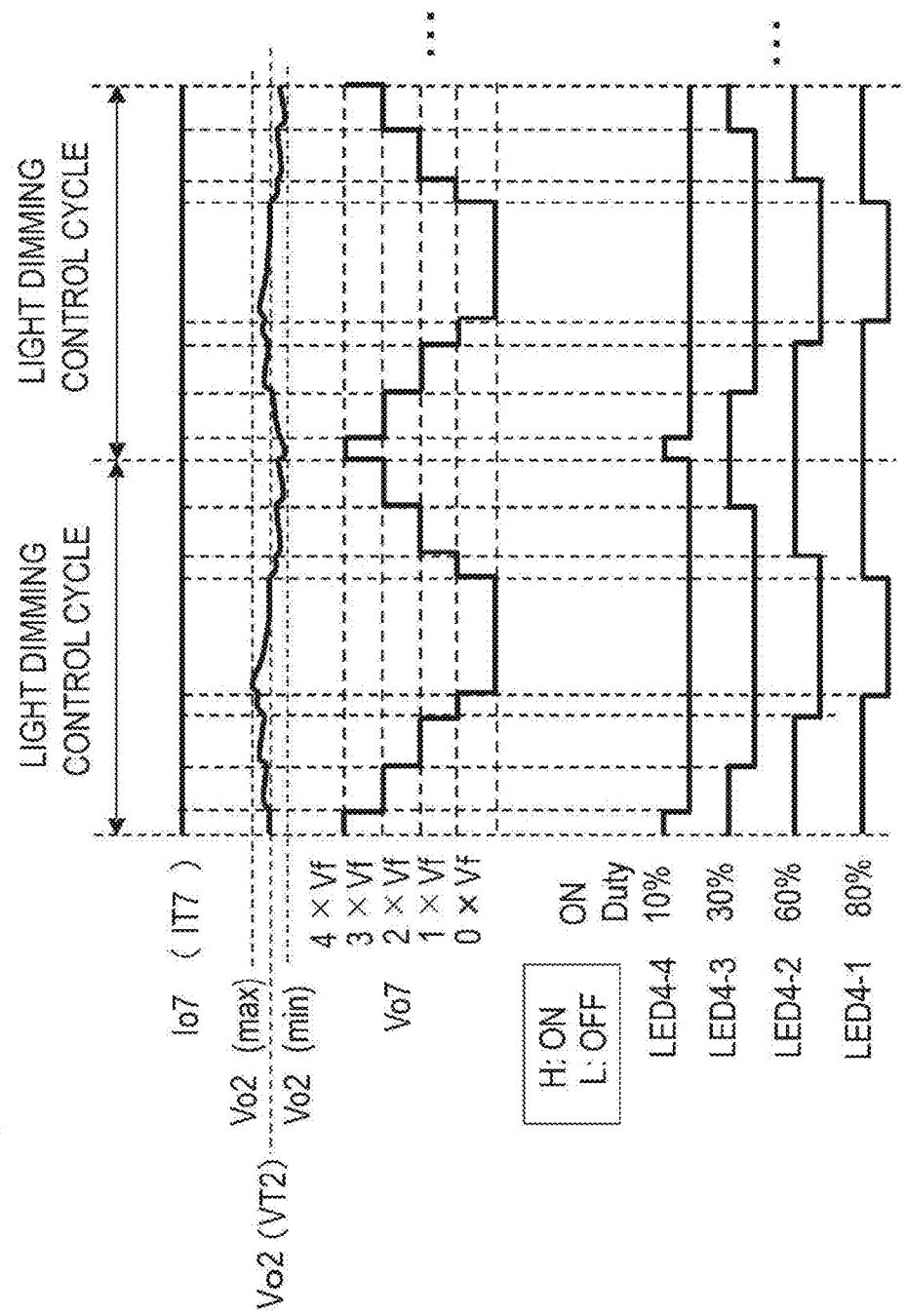
FIG. 7 is an operation explanatory diagram, according to the Embodiment 2.

FIG. 7 is an explanatory diagram of the control example in the Embodiment 2. In FIG. 7, an example is shown, in which, like in the example of FIG. 6 according to the Embodiment 1, respective light turned on duty ratios of the four LED light sources are set as 10%, 30%, 60%, and 80%. Those LED light sources are sequentially light turned on from the one with a larger light turned on duty ratio, and furthermore, sequentially light turned off from the one with a smaller light turned on duty ratio. Under those situations, in the light dimming control cycle of LED light sources, the light dimming control starts from the state in which the simultaneously light turned on number of LED light sources is four. In this case, the mentioned above same effect as the example of FIG. 6 can be obtained from FIG. 7.

Figure 8:
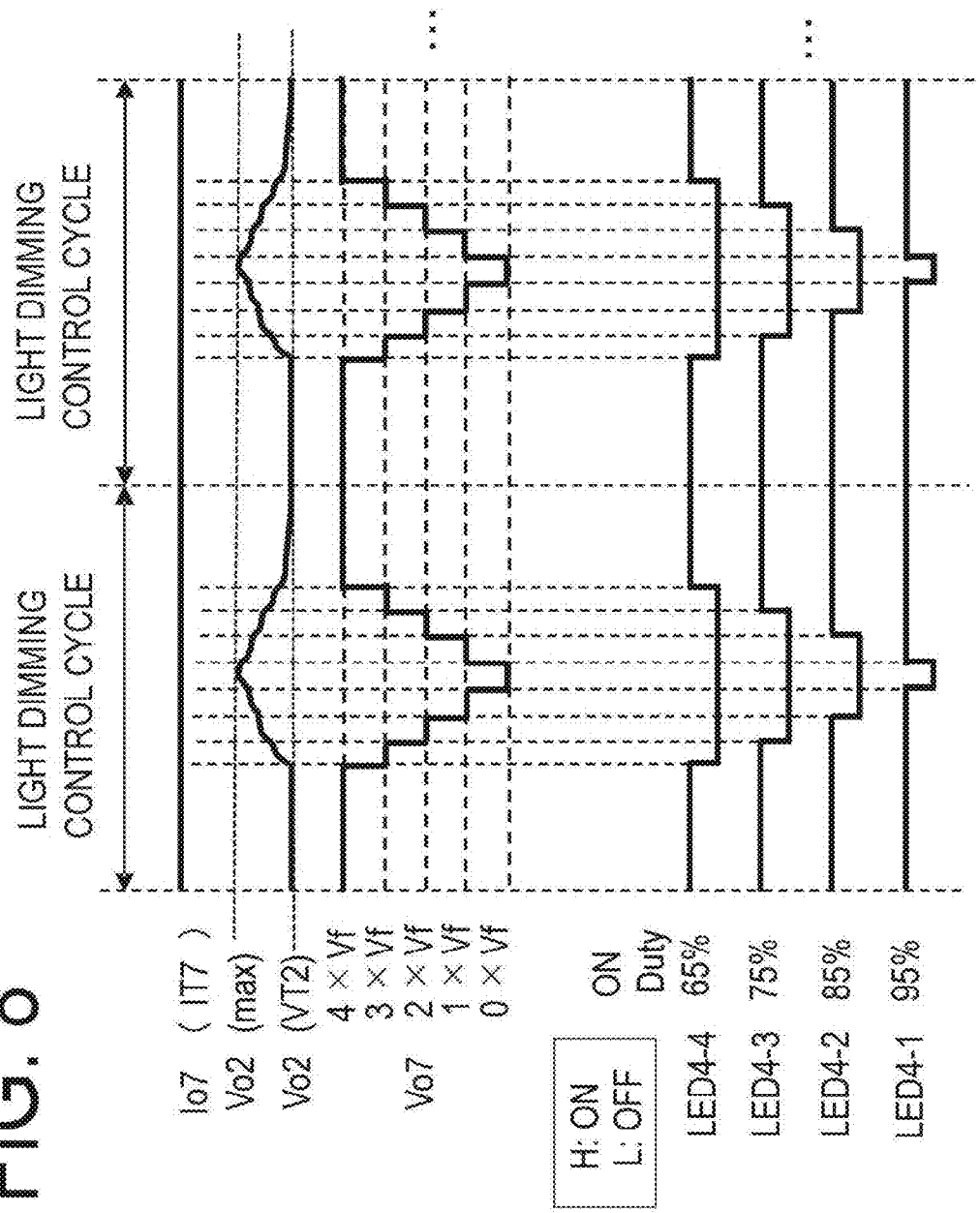
FIG. 8 is an explanatory diagram in a case where different light turned on duty ratios are employed, according to the Embodiment 2.

Moreover, as shown in FIG. 8, when respective light turned on duty ratios of the LED light sources are high (as an example, their ratios are 65%, 75%, 85%, and 95%), characteristic effects of the Embodiment 2 will be acquired. When respective light turned on duty ratios of the LED light sources are high, the time interval of light turned on timings of the LED light sources, and in addition, the time interval of light turned off timings become short. Thereby, as the response frequency band of the electric power unit 2 is narrower, that is, as the FBW is lower, it is probable that the momentary voltage drop of the output voltage value Vo2 in the electric power unit 2 may become large in magnitude.

Then, as illustrated in FIG. 8, in the light dimming control cycle of LED light sources, the light dimming control is made to start from the full light turned on state, in which the simultaneously light turned on number of LED light sources is four. Thereby, as for the change control of the LED light sources, light turned off will be performed before light turned on. Then, as for the change in the current which is output from the electric power unit 2, control is performed preferentially from the direction to cause a decrease in the current in a stepwise manner. Therefore, the control starts from the direction to cause a voltage rise in the output voltage value Vo2 of the electric power unit 2. The degree of increase in the voltage varies depending on the degree of the FBW of the electric power unit 2.

Next, since each light turned off control of the LED light sources is performed in a stepwise manner, the current which is output from the electric power unit 2 changes in the direction to cause an increase in a stepwise manner. In addition, the increased output voltage value Vo2 is decreased, and goes in the direction approaching a target voltage value. By performing such a control, the change in the output voltage value Vo2 of the electric power unit 2, which is accompanied by each light dimming control of the LED light sources, starts from the direction of going up. Thereby, the output voltage value Vo2 can be prevented more reliably from dropping below 4×Vf.

From the descriptions mentioned above, even when at least two light sources are controlled at each different light turned on duty ratio, it becomes possible, without restraining a pattern in luminous intensity distribution, to achieve the stable light turned on, where light turned off is further prevented.

Figure 9:
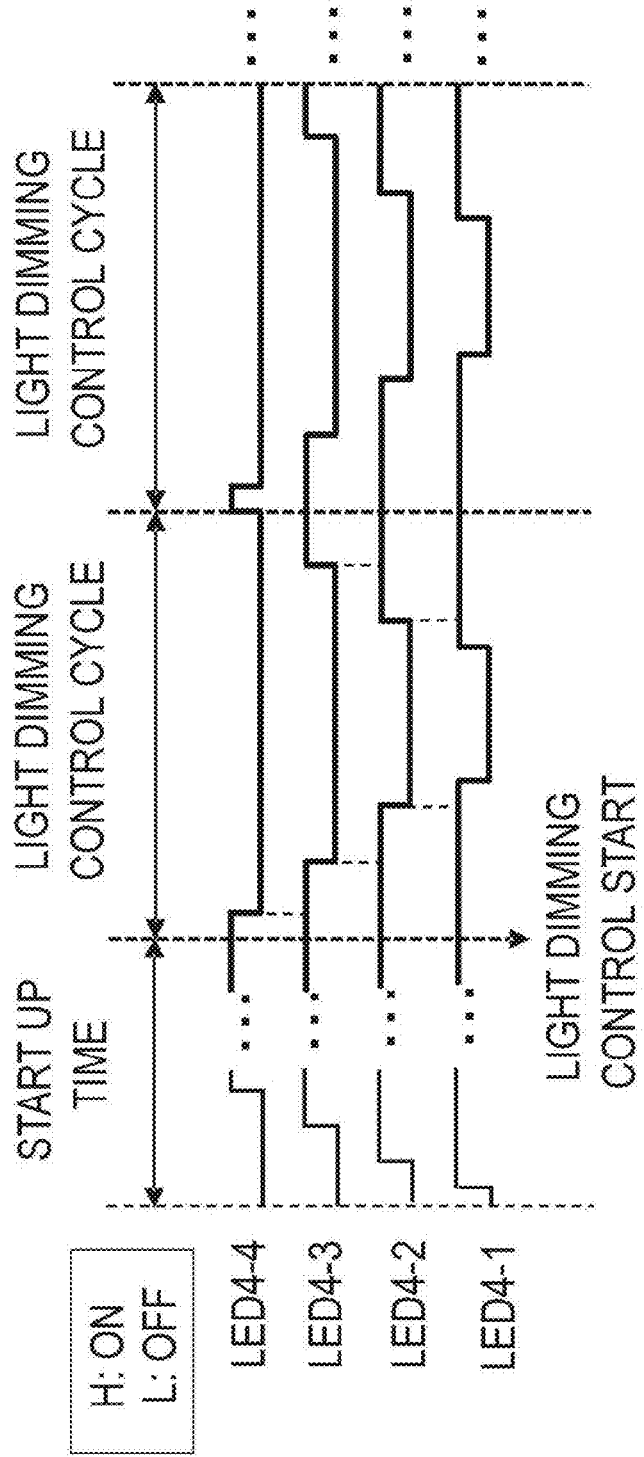
FIG. 9 is an explanatory diagram for showing the start time of light dimming control, according to the Embodiment 2.

It is worth noticing that, FIG. 9 illustrates the example of a start up time, which indicates a period until the start time, in the light dimming control of FIG. 7 and FIG. 8. As shown in FIG. 9, when respective light turned on duty ratios of the LED light sources are set to be 10%, 30%, 60%, and 80%, the maximum simultaneously light turned on number is four. Then, at a start up time, light turned on control is carried out on each of the LED light sources in a stepwise manner, so that all of the LED light sources fall preliminary in a light turned on state.

Embodiment 3

Figure 10:
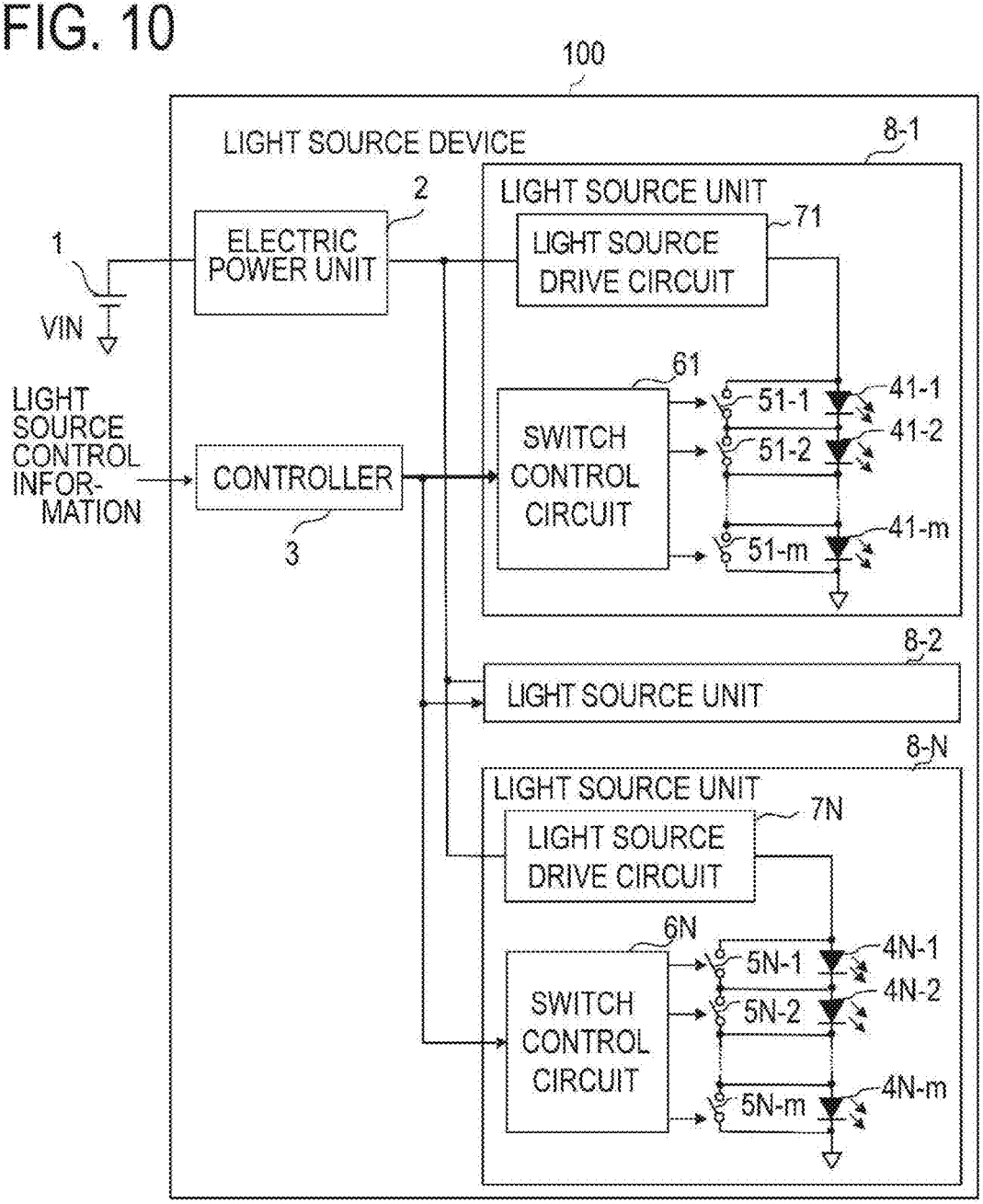
FIG. 10 is a configuration diagram of a light source device, according to the Embodiment 3.

Explanation will be made about the Embodiment 3 of the present application. According to the Embodiment 3, as shown in FIG. 10, compared to the configuration illustrated in FIG. 1, the light source device includes light source units 8-N, which are provided in plural. The light source units 8-N are each connected in parallel with the electric power unit 2, and it is configured that the output voltage value Vo2 of the electric power unit 2 is input into each of them. Here, the light source drive circuit 7 which is included in the Nth light source unit is denoted as a light source drive circuit 7N, the LED light sources 4 each as a LED light source 4N-m, and the switches 5 each as a switch 5N-m.

Employing such a configuration makes it possible to respond, when the luminous intensity distribution domain needs to be extended. On the other hand, the light source unit 8-1 and the light source unit 8-2, each having a plurality of LED light sources, are connected to the electric power unit 2. Thereby, compared to the case according to the Embodiment 1, the fluctuation of the current which is output from the electric power unit 2 changes further in a complex manner. According to the Embodiment 3, then, in at least either one of the light source units 8-1 and 8-2, the light source device starts the light dimming control from a period when the simultaneously light turned on number of LED light sources becomes the largest.

Figure 11:
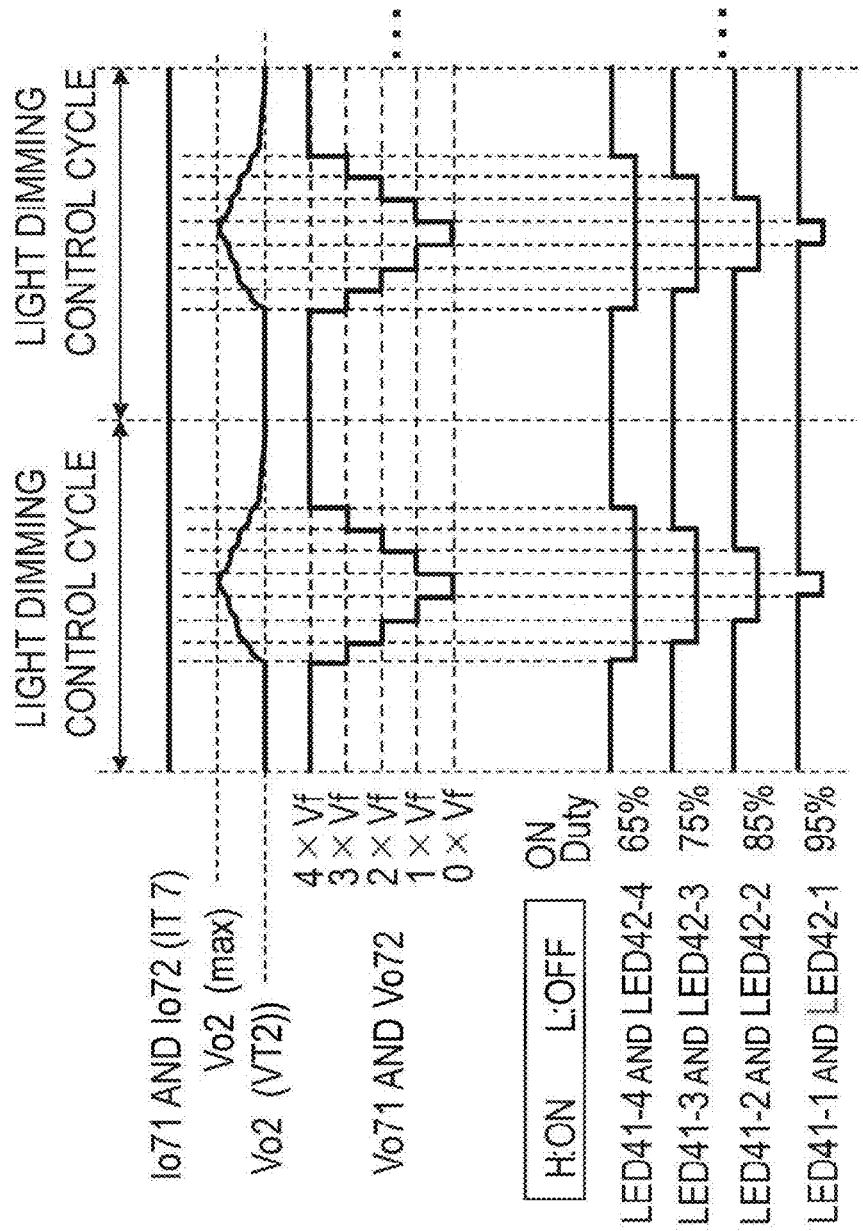
FIG. 11 is an operation explanatory diagram, according to the Embodiment 3.

FIG. 11 is an explanatory diagram of the control example according to the Embodiment 3. In FIG. 11, explanation will be made, as an example, about a case in which the number of the light source units is two (N=2), and furthermore, four LED light sources (m=4) are contained in each of the light source units. Further, in FIG. 11, in each of the light source units, respective light turned on duty ratios of the four LED light sources are set to be 65%, 75%, 85%, and 95%. Those LED light sources are sequentially light turned on from the one with a larger light turned on duty ratio, and furthermore, sequentially light turned off from the one with a smaller light turned on duty ratio. Under those situations, in the light dimming control cycle of LED light sources, the light dimming control starts from the state in which the simultaneously light turned on number of LED light sources is four.

It is assumed that, the light source drive circuits 71 and 72, each in a light source unit, will be controlled so that their output currents Io71 and Io72 may become the same target current IT7.

As mentioned above, and illustrated in FIG. 8 and FIG. 11, when respective light turned on duty ratios of the LED light sources are high, the time interval between light turned on timings of the LED light sources, and the time interval of light turned off timings become short. Then, as the FBW of the electric power unit 2 becomes smaller, it is probable that the momentary voltage drop of the output voltage value Vo2 in the electric power unit 2 may become larger in magnitude.

As illustrated in FIG. 11, then, in each light dimming control cycle of the LED light sources in both of the light source units, the light dimming control starts from the state in which the simultaneously light turned on number of LED light sources is four. Thereby, each change control of the LED light sources will be performed from light turned off, before light turned on. Then, as for the fluctuation in the current which is output from the electric power unit 2 to each of the light source units, the light source device controls preferentially from the direction to decrease in a stepwise manner.

Therefore, the light source device starts the control from the direction in which the output voltage value Vo2 of the electric power unit 2 goes up. The degree of increase in the voltage varies depending on the degree of FBW of the electric power unit 2. Next, in each of the light source units, each light turned off control of the LED light sources is performed in a stepwise manner. Thereby, as for the fluctuation in the current which is output from the electric power unit 2, the direction will be changed to increase in current in a stepwise manner, and increased output voltage value Vo2 decreases, and goes in the direction to become closer to a target voltage value.

By performing such a control, the fluctuation in the output voltage value Vo2 of the electric power unit 2 due to each light dimming control of the LED light sources starts from the direction to go up. Thereby, the output voltage value Vo2 of the electric power unit 2 can be prevented more reliably from dropping below 4×Vf.

It is worth noticing that, in FIG. 11, an example is shown in which the light dimming control starts in both of the light source units from the state in which the simultaneously light turned on number of LED light sources is four. It is allowed that, however, only either one of the light source units is set as an object for the mentioned above control, and in addition, in the light dimming control cycle, adjustment is carried out, so that the sum total of the currents which are output from the electric power unit 2 to each of the light source units may change from the direction to decrease in a stepwise manner. Moreover, the target current value of the light source drive circuit in each of the light source units is allowed to set as target currents IT71 and IT72, which are different each other, and in addition, adjustment may be carried out, so that the sum total current from the mentioned above electric power unit 2 may change from the direction to decrease in a stepwise manner.

From the descriptions mentioned above, in the case where a plurality of light source units is provided, and even when at least two light sources in each of the light source units are controlled at each different light turned on duty ratio, it becomes possible, without restraining a pattern in luminous intensity distribution, to achieve the stable light turned on, where light turned off is prevented further.

Embodiment 4

Also in the Embodiment 4, the configuration which is illustrated in FIG. 10 is employed. In addition, explanation will be made, as an example, about a case in which the number of light source units is two (N=2), and furthermore, four light sources (LEDs) are contained (m=4) in each of the light source units. As mentioned above, since a plurality of light source units is connected to the electric power unit 2, the fluctuation of the current which is output from the electric power unit 2 changes in a complex manner. Then, according to the Embodiment 4, further to the Embodiment 3, in at least one of other light source units, the light dimming control starts from the period when the simultaneously light turned on number of the light sources becomes the smallest.

Figure 12:
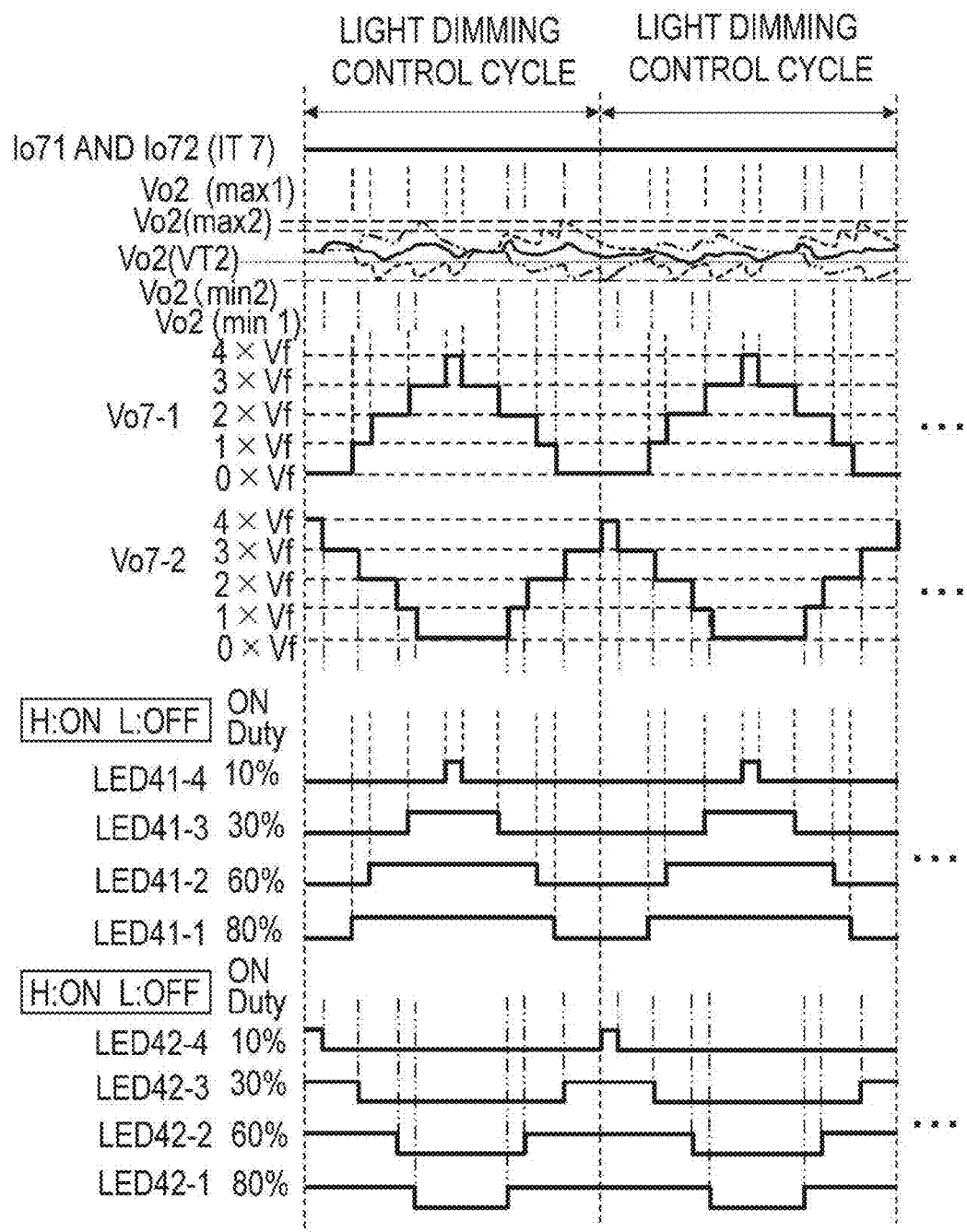
FIG. 12 is an operation explanatory diagram, according to the Embodiment 4.

FIG. 12 is an explanatory diagram of the control example according to the Embodiment 4. In FIG. 12, explanation will be made, as an example, about a case in which, in each of the two light source units, respective light turned on duty ratios of the four LED light sources are set to be 10%, 30%, 60%, and 80%. In addition, those light sources are sequentially light turned on from the one with a larger light turned on duty ratio, and furthermore, sequentially light turned off from the one with a smaller light turned on duty ratio. Moreover, it is assumed that, the light source drive circuits 71 and 72, each in a light source unit will be controlled so that their output currents Io71 and Io72 may have the same target current IT7.

In FIG. 12, explanation will be made at first about the control of a light source unit 8-2, in which a LED light source 42-1 to a LED light source 42-4 are contained. In the light dimming control cycle of LED light sources, regarding the LED light source 42-1 to the LED light source 42-4, the light dimming control starts from a state in which the simultaneously light turned on number of LED light sources is four.

In this case, as mentioned above, each change control of the LED light sources will be performed from light turned off, before light turned on. In addition, as for the change of the current Io2-2, which is output from the electric power unit 2 to the light source unit 8-2, the light source device controls preferentially from the direction to decrease the current in a stepwise manner. After that, by the light re-turned on control, the change of the current Io2-2 is controlled in a direction to increase the current in a stepwise manner.

Here, it is assumed that, when the light source device does not operate the other light source unit 8-1 (the current output of Io71 is suspended), the output voltage value Vo2 of the electric power unit 2, like the chain double dashed line voltage waveform inside FIG. 12, will increase up to an output voltage value Vo2 (max1), which is higher than the target voltage value VT2, due to the stepwise manner reduction of the current Io2-2. Moreover, it is assumed that, due to the subsequent stepwise manner increase of the current Io2-2, the output voltage value Vo2 of the electric power unit 2 will decrease to an output voltage value Vo2 (min1), which is lower than the target voltage value VT2.

Next, explanation will be made about the control of the light source unit 8-1, in which a LED light source 41-1 to a light source 41-4 are contained in FIG. 12. In the light dimming control cycle of LED light sources, the light dimming control of the LED light source 41-1 to the LED light source 41-4 starts from the state in which the simultaneously light turned on number of LED light sources is zero. In this case, each change control of the LED light sources will be performed from the light turned on, before light turned off. In addition, as for the change of the current Io2-1 which is output from the electric power unit 2 to the light source unit 8-1, the light source device controls preferentially from the direction to increase the current in a stepwise manner. After that, by the light re-turned off control, the change of the current Io2-1 is controlled in the direction to decrease the current in a stepwise manner.

Here, it is assumed that, when the light source device does not operate the other light source unit 8-2 (the output of the current Io72 is suspended), due to the stepwise manner increase of the current Io2-1, like the dashed line voltage waveform in FIG. 12, the output voltage Vo2 of the electric power unit 2 will decrease to an output voltage value Vo2 (min1), which is lower than a target voltage value VT2. Moreover, it is assumed that, dure to a subsequent stepwise manner reduction of the current Io2-2, the output voltage value Vo2 will increase up to an output voltage value Vo2 (max1), which is higher than a target voltage value VT2.

As described above, in the light source unit 8-2, the light dimming control starts from the period when the simultaneously light turned on number of LED light sources becomes the largest. Furthermore, in the light source unit 8-1, the light dimming control starts from the period when the simultaneously light turned on number of LED light sources becomes the smallest.

Here, in each of the light source units, a case is considered in which a current Io72 and a current Io71, which have both a target current IT7, are supplied to the LED light sources which are contained in each of the light source units. In this case, in the light dimming control cycle, the current Io2-2 and the current Io2-1 are supplied from the mentioned above electric power unit 2 to the light source unit 8-2 and the light source unit 8-1, respectively. In addition, the stepwise manner change directions of those currents have a relationship to be offset, and thereby, the fluctuation of the sum total current of Io2-2 and Io2-1 is restrained.

As a result, as for the output voltage value Vo2 of the electric power unit 2, like the solid line voltage waveform in FIG. 12, the maximum voltage value at the fluctuation time can be restrained to an output voltage value Vo2 (max2), which is lower than the output voltage value Vo2 (max1), and moreover, the minimum voltage value can be restrained to an output voltage value Vo2 (min2), which is higher than the output voltage value Vo2 (min1). Therefore, the output voltage value Vo2 can be prevented more reliably from dropping below 4×Vf.

It is worth noticing that, illustrated in FIG. 12 is about the case in which the number of light source units is two (N=2). It is allowed, however, to employ the configuration in which two light source units, having the same control combination, make a pair, and the pair is added one by one. In that case, it is allowed to change individually the current which is supplied to the LED light sources, for every pair of the light source units. Moreover, even between the two light source units which are included in each pair, as long as the output voltage value Vo2 falls within a range to have a value which is no lower than 4×Vf, it is allowed to change currents individually, supplied to the LED light sources which are contained in each of the light source units.

Furthermore, in the case where the light source device is constituted of odd numbered light source units, it is enough, to the mentioned above pair of the light source units, to add one light source unit, which performs the same control, as illustrated in the mentioned above light source unit 8-1 or 8-2. In addition, the one which can perform the condition to further restrain the fall of the output voltage value Vo2 is chosen preferentially.

From the descriptions mentioned above, in the case where a plurality of light source units is provided, and in addition, even in the case where, at least two light sources in each of the light source units are controlled at each different light turned on duty ratio, it becomes possible, without restraining a pattern in luminous intensity distribution, to achieve the stable light turned on, where light turned off is further prevented.

Embodiment 5

Also in the Embodiment 5, the configuration which is illustrated in FIG. 10 is employed. In addition, explanation will be made, as an example, about a case in which the number of light source units is two (N=2), and furthermore, four LED light sources 4 (m=4) are contained in each of the light source units.

As mentioned above, a plurality of light source units is connected to the electric power unit 2, and thereby, the fluctuation of the current which is output from the electric power unit 2 changes in a complex manner. Then, in the Embodiment 5, further with regard to the Embodiment 3 and the Embodiment 4, in the plurality of light source units, light turned on duty ratios of the LED light sources in any light source unit, are set to be the same as any of the light turned on duty ratios of the light sources, in at least the other one light source unit.

By employing the configuration mentioned above, complexity in the fluctuation of the current which is output from the electric power unit 2 is reduced. Further, the drop of the output voltage value Vo2 can be restrained more reliably, and in addition, the luminous intensity distribution domain can be easily extended.

Here, in FIG. 11 as for the Embodiment 3, and further, in FIG. 12 as for the Embodiment 4, exemplary cases are already illustrated in which, the combination of the light turned on duty ratios of the LED light sources is the same in each of the two light source units. By employing the configuration mentioned above, at first, with regard to the Embodiment 3, in the light dimming control cycle of respective LED light sources, the light source device starts the control from the direction so that the fluctuation of the output voltage value Vo2 of the electric power unit 2 may go up more reliably. In addition, the output voltage value Vo2 can be prevented from dropping below 4×Vf.

Moreover, with regard to the Embodiment 4, the current Io2-2 and the current Io2-1 are supplied from the electric power unit 2 to the light source unit 8-2 and the light source unit 8-1, respectively. In addition, the stepwise manner change directions of those currents have a relationship to be offset further, and thereby, the output voltage value Vo2 can be prevented from dropping below 4×Vf.

Moreover, in addition to the mentioned above effect, the combination of the light turned on duty ratios of the LED light sources is the same in each of the light source units, and thereby, the pattern in luminous intensity distribution can be unified for every light source unit. Therefore, only by increasing the number of light source units which are connected to the electric power unit 2, it becomes possible to extend easily the luminous intensity distribution domain with the same characteristics.

As an example of the case for extending a luminous intensity distribution domain, there is a case in which two light source units are arranged next to each other, and the luminous intensity distribution characteristics is provided so that the central portion may become the brightest. In each of the light source units, the same arrangement is conducted on a plurality of LED light source, and thereby, low cost can be achieved. In such a configuration, for example, regarding the control of FIG. 12 according to the Embodiment 4, the control may be changed into the one which is illustrated in FIG. 13.

Figure 13:
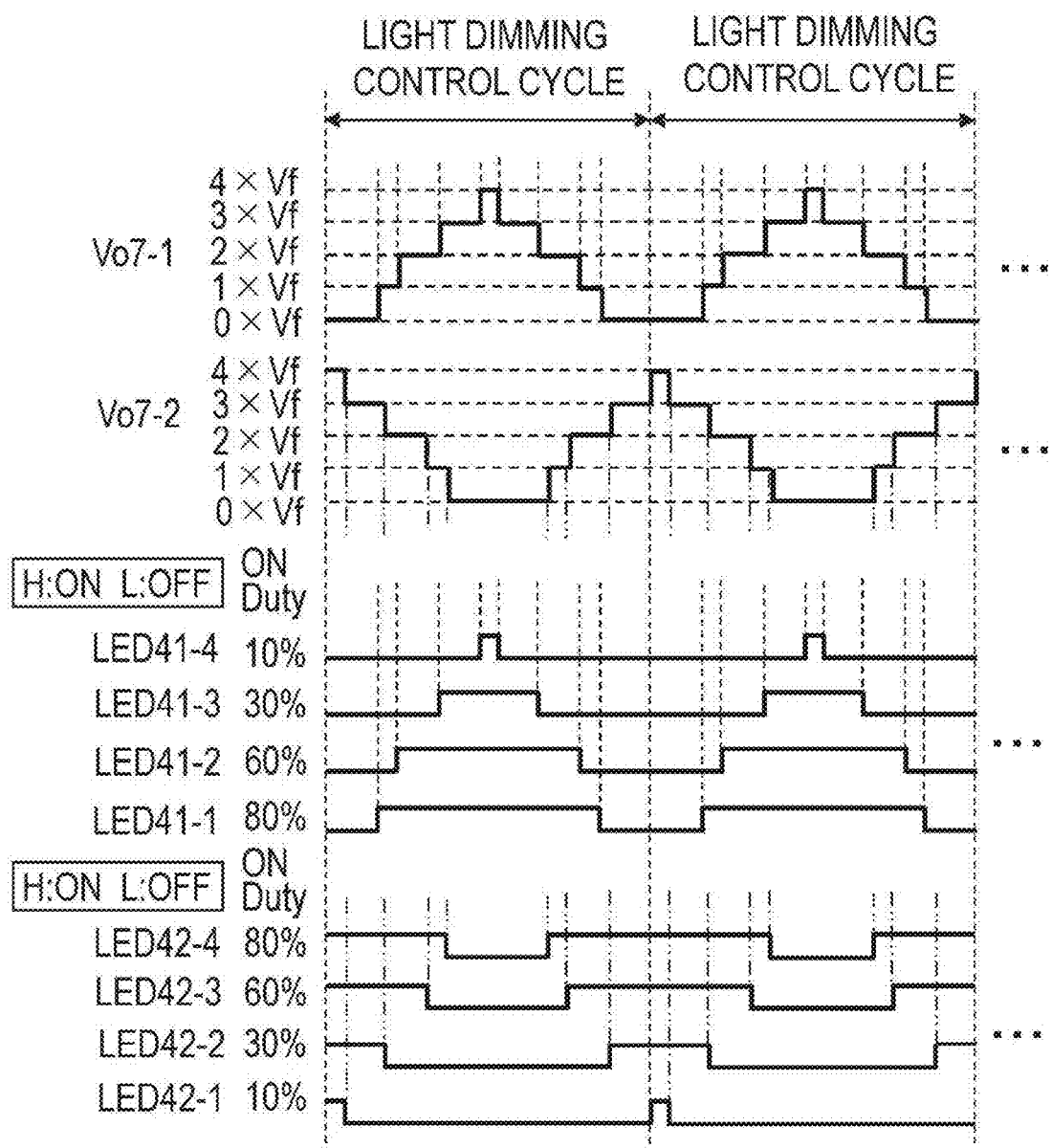
FIG. 13 is an operation explanatory diagram, according to the Embodiment 5.

In FIG. 13, it is assumed that the light source unit 8-2, which contains LED light source 42-$m$, is placed to adjoin to the light source unit 8-1, which contains LED light source 41-$m$, and in addition, the LED light source 41-1 and the LED light source 42-4, which are both illustrated in FIG. 13, may be arranged to adjoin each other.

As exemplarily illustrated in FIG. 13, in the light source unit 8-1, the LED light source 41-1 side is made to have the highest light turned on duty ratio, and is controlled to become brighter. Moreover, in the light source unit 8-2, the LED light source 42-4 side is made to have the highest light turned on duty ratio, and is controlled to become brighter. The light turned on duty ratios in each of the light source units are in a symmetrical row, with a border on the central part of the adjoining light source units. In addition, the central part has the highest light turned on duty ratio, and a bright pattern in luminous intensity distribution is achieved.

Figure 14:
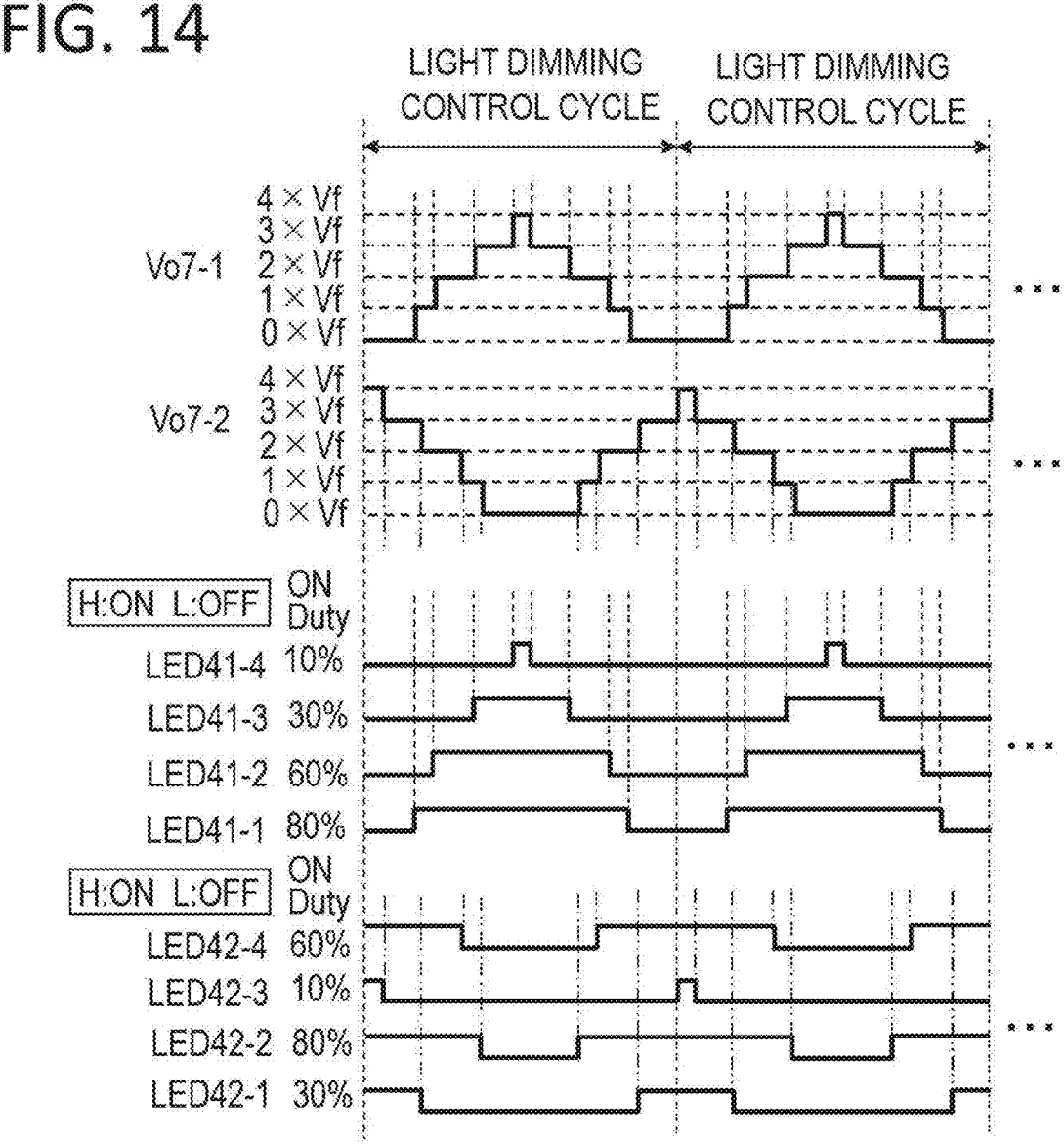
FIG. 14 is an operation explanatory diagram in the second control example, according to the Embodiment 5.

Moreover, when a different arrangement of a plurality of LED light source needs to be designed in each of the light source units, it is allowed to extend a desired luminous intensity distribution domain, corresponding to the arrangement, for example, by the control which is, for example, illustrated in FIG. 14.

According to the above descriptions, in the case where a plurality of light source units is provided, and in addition, even in the case where at least two light sources in each of the light source units are controlled at each different light turned on duty ratio, it becomes possible, without restraining a pattern in luminous intensity distribution, to achieve the stable light turned on, where light turned off can be prevented, while the luminous intensity distribution domain is extended easily.

Embodiment 6

Figure 15:
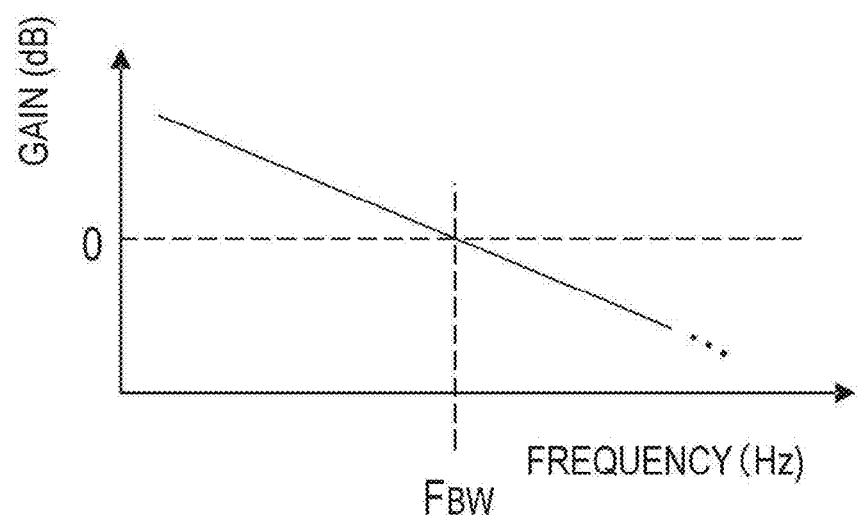
FIG. 15 is an explanatory diagram of the gain—frequency characteristic in the loop transfer function of an electric power unit.

In the Embodiment 6, explanation will be made, as an example, about the configuration which is exemplarily illustrated in FIG. 1 or FIG. 10. In FIG. 15, shown is an example of gain (loop gain)—frequency characteristic of the loop transfer function of the electric power unit 2, according to FIG. 1 or FIG. 10. As shown in FIG. 2, according to the present Embodiment 6, explanation will be made, as an example, about the configuration of a boost chopper, as the electric power unit 2, which monitors the output voltage value Vo2 to perform negative feedback control, and controls a switching element Q23.

When the light source device performs negative feedback control, the upper limit frequency (the zero crossing frequency of a loop gain) FBW at the response frequency band, which is shown in FIG. 15, will be designed, taking into consideration the stability due to a phase margin and a gain margin. According to this FBW, time is determined during which the electric power unit 2 can converge an output voltage value Vo2 on a target value VT2, in response to a load fluctuation. Specifically, the output voltage value Vo2 converges in the reciprocal of the frequency FBW, or time tBW (=1/FBW). When load fluctuation occurs, however, at a frequency higher than the frequency FBW, the output voltage value Vo2 converges with a delay over the time of tBW.

According to the Embodiment 6, such a characteristic is used. The reciprocal time tBW of the upper limit frequency FBW at the response frequency band of the electric power unit 2 is set as a value which is shorter than the at least one of a first time and a second time; the first time is from the light turned off timing of any light source among a plurality of light sources, to the light turned off timing of other light source which is light turned off in the next place, and the second time is from the light turned off timing of the light source which is light turned off in the last place, to the light turned on timing of the light source which is light turned on in the next place. Thereby, even when at least two light sources are controlled at each different light turned on duty ratio, it becomes possible to achieve the stable light turned on, where light turned off is prevented further.

Figure 16:
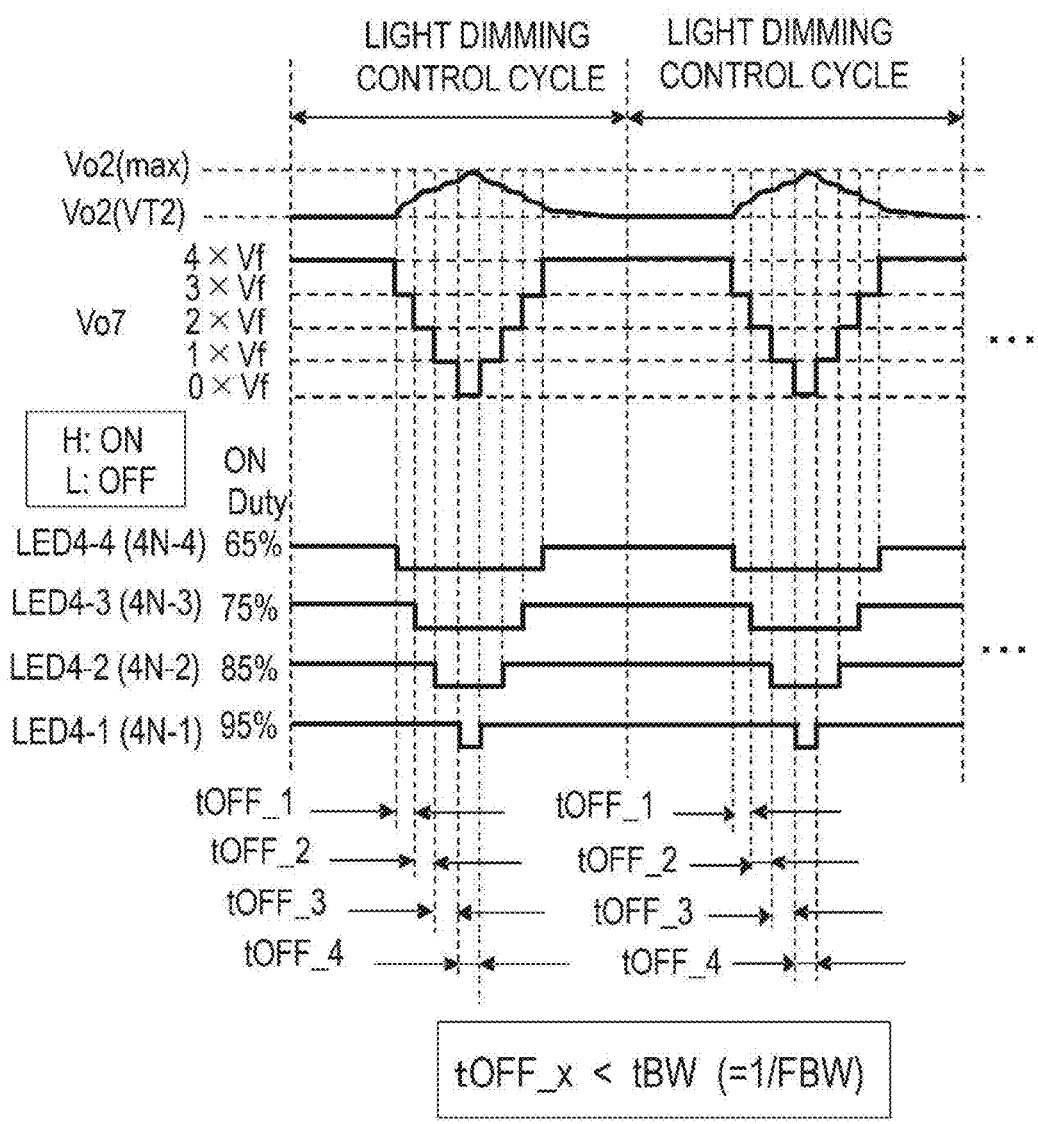
FIG. 16 is an operation explanatory diagram, according to the Embodiment 6.

FIG. 16 is an explanatory diagram of the control example according to the sixth Embodiment. In FIG. 16, illustrated is a case in which the number of LED light sources is four (m=4), in the light source unit which is shown in FIG. 1, or in any light source unit among a plurality of light source unit which is shown in FIG. 10. Moreover, FIG. 16 illustrates a case in which respective light turned on duty ratios of the four LED light sources are set to be 65%, 75%, 85%, and 95%. In addition, those LED light sources are sequentially light turned on from the one with a larger light turned on duty ratio, and furthermore, sequentially light turned off from the one with a smaller light turned on duty ratio. Under those situations, in the light dimming control cycle of LED light sources, the light dimming control starts from the state in which the simultaneously light turned on number of LED light sources is four.

Here, in the four LED light sources, a period tOFF_x is defined as the time from the light turned off timing of a certain LED light source to the light turned off timing of another LED light source which is light turned off in the next place, and also the time from the light turned off timing of a LED light source which is light turned off in the last place to the light turned on timing of a LED light source which is light turned on in the next place. For example, in FIG. 16, a time from the timing when the LED light source 4-4 (or LED light source 4N-4. Henceforth, the LED light source 4-$m$ is denoted as a representative, and the notation of LED light source 4N-m is omitted) is light turned off, to the timing when the LED light source 4-3 is light turned off is defined as tOFF_1; a time from the timing when the LED light source 4-3 is light turned off, to the timing when the LED light source 4-2 is light turned off is defined as tOFF_2; a time from the timing when the LED light source 4-2 is light turned off, to the timing when the LED light source 4-1 is light turned off is defined as tOFF_3; and a time from the timing when the LED light source 4-1 is light turned off, to the timing when the LED light source 4-1 is light turned on is defined as tOFF_4.

In FIG. 16, for example, the period of tOFF_1 is focused on. As the equivalent in-series number of LED light sources decreases from four to three, the output current Io2 of the electric power unit 2 will change in the direction to increase in current. Here, when the light source device controls at tOFF_1<tBW, the output voltage value Vo2 of the electric power unit 2 at the period end time of tOFF_1 does not converge on a target value VT2 within the period of tOFF_1. Then, the output voltage value Vo2 becomes a voltage which is higher than the target value VT2. In this way, in the light dimming control cycle, a period during which the output voltage value Vo2 is set to be higher than the target value VT2 is provided in the first place. Thereby, in the subsequent light dimming control, the output voltage value Vo2 can be prevented from dropping below 4×Vf.

Here, depending on the combination of light turned on duty ratios, even only in a situation where tOFF_1<tBW is employed, a case comes to mind that the output voltage value Vo2 may approach 4×Vf, or fall below it. In that case, the matter can be dealt with, by adjusting the number of periods tOFF_x which are set to be shorter than tBW, and their timings. For example, the matter can be dealt with as follows: the period is set to be tOFF_1<tBW, and furthermore, tOFF_2<tBW, and the output voltage value Vo2 then becomes high continuously. Or, the period is set to be tOFF_1<tBW, and furthermore, tOFF_3<tBW, and, the output voltage value Vo2 then becomes high in a stepwise manner.

Moreover, when the period is set to be tOFF_x<tBW, the output voltage value Vo2 after a period of tOFF_x becomes a higher voltage, as the light source device controls at a smaller tOFF_x with regard to tBW. Therefore, the matter can be dealt with by adjusting the control time of tOFF_x, so that the output voltage value Vo2 may become a required voltage.

From the descriptions mentioned above, even when at least two light sources in a light source unit are controlled at each different light turned on duty ratio, it becomes possible, without restraining a pattern in luminous intensity distribution, to achieve the stable light turned on, where light turned off is prevented more reliably.

Embodiment 7

In the Embodiment 7, explanation will be made, as an example, about the configuration which is illustrated in FIG. 1 or FIG. 10. As mentioned above, according to the light source device of the present application, a case is assumed in which, among a plurality of LED light sources, the light dimming is performed on at least two LED light sources, at the same light turned on duty ratio. All of previous explanations have been made to illustrate about the cases in which the light turned on duty ratios of LED light sources which are contained in light source units are different each other. As another combination, a case is, however, considered in which, among a plurality of LED light sources, there are ones which have the same light turned on duty ratio.

Then, in the Embodiment 7, among a plurality of LED light sources, the light dimming is performed on at least two LED light sources, at the same light turned on duty ratio. In that situation, in the state where light turned on timings do not overlap each other, each of the light turned on timings is set between the light turned on timing of a LED light source with a next larger light turned on duty ratio and the light turned on timing of a LED light source with a next smaller light turned on duty ratio. Or, in the state where light turned off timings do not overlap each other, each of the light turned off timings is set between the light turned off timing of a light source with a next larger light turned on duty ratio and the light turned off timing of a light source with a next smaller light turned on duty ratio.

Figure 17:
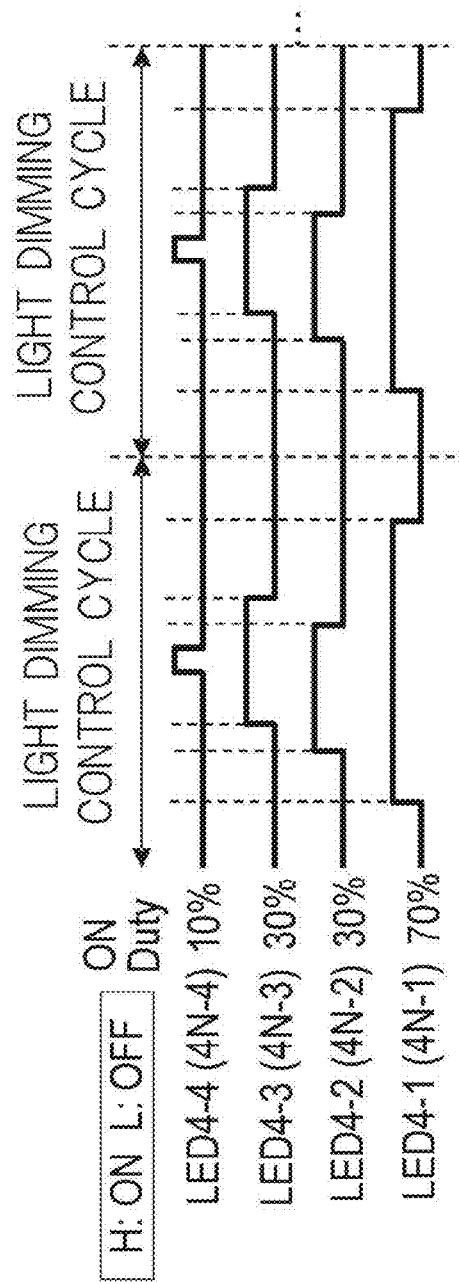
FIG. 17 is a first operation explanatory diagram, according to the Embodiment 7.
Figure 18:
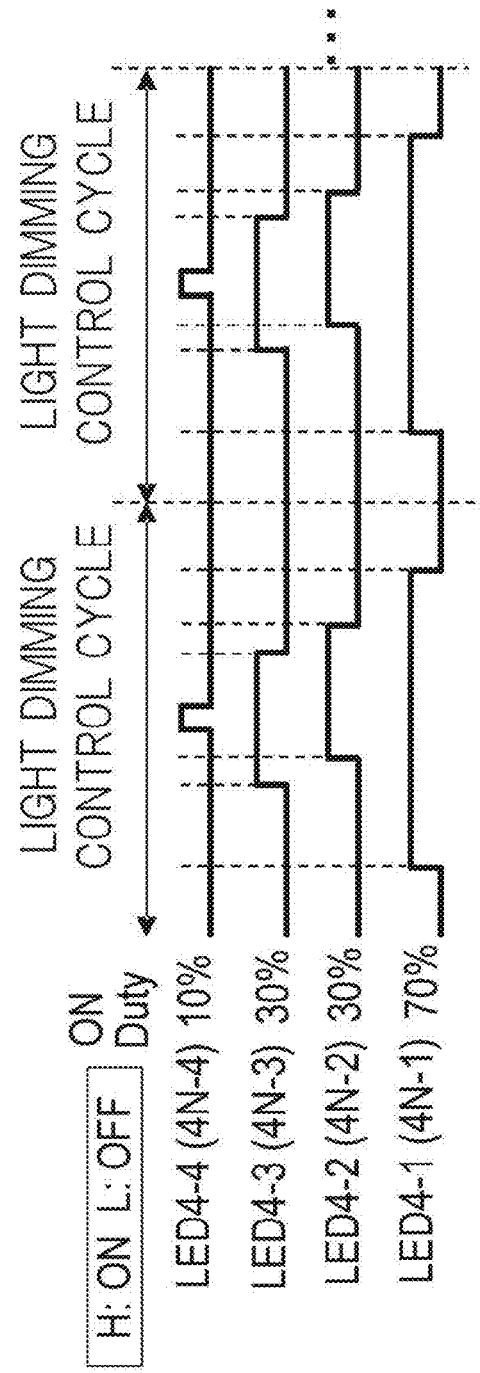
FIG. 18 is a second operation explanatory diagram, according to the Embodiment 7.

FIG. 17 and FIG. 18 are explanatory diagrams of the control example according to the Embodiment 7. Both diagrams illustrate a case in which the number of LED light sources is four (m=4), in the light source unit which is shown in FIG. 1, or in any light source unit among a plurality of light source units which is shown in FIG. 10.

Moreover, FIG. 17 and FIG. 18 each illustrate a case in which the light turned on duty ratios of four LED light sources are set to be 10%, 30%, 30%, and 70%. In addition, those LED light sources are sequentially light turned on from the one with a larger light turned on duty ratio, and furthermore, sequentially light turned off from the one with a smaller light turned on duty ratio. Under those situations, in the light dimming control cycle of LED light sources, the light source device starts the light dimming control from the state in which the simultaneously light turned on number of LED light sources is zero.

Here, according to the Embodiment 7, like in the Embodiment 6, the notation of LED light source 4N-m is omitted, in a plurality of light source units, and henceforth, the notation of LED light source 4-m in a single light source unit is indicated as a representative. In FIG. 17 and FIG. 18, it is assumed that LED light sources with the same light turned on duty ratio are a LED light source 4-3 and a LED light source 4-2. Moreover, it is assumed that the light turned on duty ratio of a LED light source 4-4 is 10%, and the light turned on duty ratio of a LED light source 4-1 is 70%.

As illustrated in FIG. 17, in the light dimming control cycle, light turned on starts, in the first place, from the LED light source 4-1 with the largest light turned on duty ratio. Here, the light source unit starts the light turned on of the LED light source 4-3 and the LED light source 4-2, each with a next larger light turned on duty ratio. At this time, however, as illustrated in FIG. 17, the light source unit controls the light turned on timing of the LED light source 4-3 to delay rather than that of the LED light source 4-2, so that light turned on timings of the LED light source 4-3 and the LED light source 4-2 may not overlap each other. In the last place, the light source unit starts the light turned on of the LED light source 4-4, with a next larger light turned on duty ratio (or with the smallest light turned on duty ratio). Here, as for the delay of the light turned on timing of the mentioned above LED light source 4-3, the delay time is determined so that the light turned off timings of LED light sources do not overlap each other within the light dimming control cycle.

Moreover, as illustrated in FIG. 18, it is allowed to control the light turned on timing of the LED light source 4-2 to delay rather than that of the LED light source 4-3. Also in that case, the delay time is determined so that light turned off timings of LED light sources do not overlap each other within the light dimming control cycle. By employing the configuration mentioned above, even in a case where the same light turned on duty ratio is used, design flexibility in the pattern of light turned on duty ratios is high, and the design can be made easily without restrictions.

From the descriptions mentioned above, even when at least two light sources are controlled at each different light turned on duty ratio, and furthermore, at least two LED light sources are controlled at the same light turned on duty ratio, it becomes possible to achieve the stable light turned on, where light turned off is prevented, in a state where the pattern in luminous intensity distribution is restricted to a lesser extent.

Embodiment 8

Also in the Embodiment 8, explanation will be made, as an example, about the configuration which is illustrated in FIG. 1 or FIG. 10. The controller 3 in FIG. 1 or FIG. 10 inputs light source control information from an ECU (Electronic Control Unit), for example, which is on the outside of the light source device 100, and outputs switch control signals based on the light source control information. In the case of a car, as an example of the light source control information, a case is illustrated in the Embodiment 1. According to the control information, when an oncoming car is detected by a camera or a sensor or the like, only a specific LED light source among a plurality of LED light sources is light turned off, so that a portion of the oncoming car may not be irradiated by light.

Then, according to the Embodiment 8, for example, a case in which at the time when driving on a straight-line road or the like, an oncoming car is not detected, is defined as normal times. It is assumed that the switch control circuit 6 of FIG. 1 or the switch control circuit 6N of FIG. 10 controls the switch 5-$m$ or the switch 5N-m, so that, at normal times, light sources may be driven each at a light turned on duty ratio which is defined beforehand.

Moreover, when an oncoming car is detected at a driving time, a "light turned off indicating signal of a specific light source" is output as the light source control information from an external ECU, and the controller 3 receives the mentioned above light turned off indicating signal. In that case, it is assumed that, so that only a specific LED light source may be light turned off, the controller 3 controls the switch 5-$m$ or the switch 5N-m, through the switch control circuit 6 or the switch control circuit 6N.

Moreover, it is assumed that, when an oncoming car is no longer detected, a "light turned on (adjusting the amount of light) return indicating signal of a specific light source" will be output, as the light source control information, from an external ECU, and the controller 3 will receive the above light turned on (adjusting the amount of light) return. In that case, it is assumed that, so that the light source unit may re-start the light turned on (adjusting the amount of light) of a specific light source which has been light turned off, the controller 3 will control the switch 5-$m$ or the switch 5N-m, through the switch control circuit 6 or the switch control circuit 6N, and the state will return to the one at normal times.

It is worth noticing that, while an oncoming car is detected, and in addition, the movement of the oncoming car is detected, it is allowed to output, from an external ECU, as the light source control information which contains both of a "light turned off indicating signal of a specific light source" over a light source which becomes newly a light turned off object concerned and a "light turned on (adjusting the amount of light) return indicating signal of a specific light source" over a light source which is out of the light turned off object, so that a portion of the oncoming car may not be irradiated by light, depending on situations at each time.

According to the present Embodiment 8, a case is dealt with, in which a specific light source among a plurality of light sources is light turned off, based on the light source control information. In this case, when the light turned on duty ratio of a light source concerned, the ration being before its light turned off, is 100%, light sources are light turned off, during a period when the simultaneously light turned on number among light sources in the light source unit in which the light source concerned is contained, is the smallest or the largest; or during a transition period from a state in which the simultaneously light turned on number is the largest, to a state in which the number is the smallest, and furthermore, at the timing not overlapping with the light turned off timing of other light sources in the light source unit concerned. In addition, when the light turned on duty ratio of a light source concerned, the ratio being before its light turned off, is other than 100%, light sources are light turned off at the light turned off timing of the light dimming control, and the light turned off state is maintained. By employing the configuration mentioned above, also when a specific light source is light turned off at the detection time of an oncoming car and others, it becomes possible, without restraining a pattern in luminous intensity distribution, to achieve the coexistence with the stable light turned on, where light turned off of other light sources are prevented.

Moreover, according to the Embodiment 8, a case is dealt with, in which the light turned off state of a specific light source which has been turned off, based on the light source control information is returned to a light turned on state. In this case, when the light turned on duty ratio of a light source concerned, the ratio being before its light turned off, is 100%, light sources are returned to light turned on, during a period when the simultaneously light turned on number of light sources in the light source unit in which the light source concerned is contained is the smallest or during a period when the number is the largest; or during a transition period from the state in which the simultaneously light turned on number is the smallest to the state in which the number is the largest, and furthermore, at the timing not overlapping with light turned on timings of other light sources in the light source unit concerned. In addition, when the light turned on duty ratio of a light source concerned, the ratio being before its light turned off, is other than 100%, light sources are returned to light turned on, at the light turned on timing of the light dimming control, and the light dimming is maintained at a predetermined light turned on duty ratio. By employing the configuration mentioned above, also at the light turned off release (return to light turned on) time in a case where an oncoming car is no longer detected, it becomes possible, without restraining a pattern in luminous intensity distribution, to achieve the stable light turned on, where light turned off of each light source is prevented.

Figure 19:
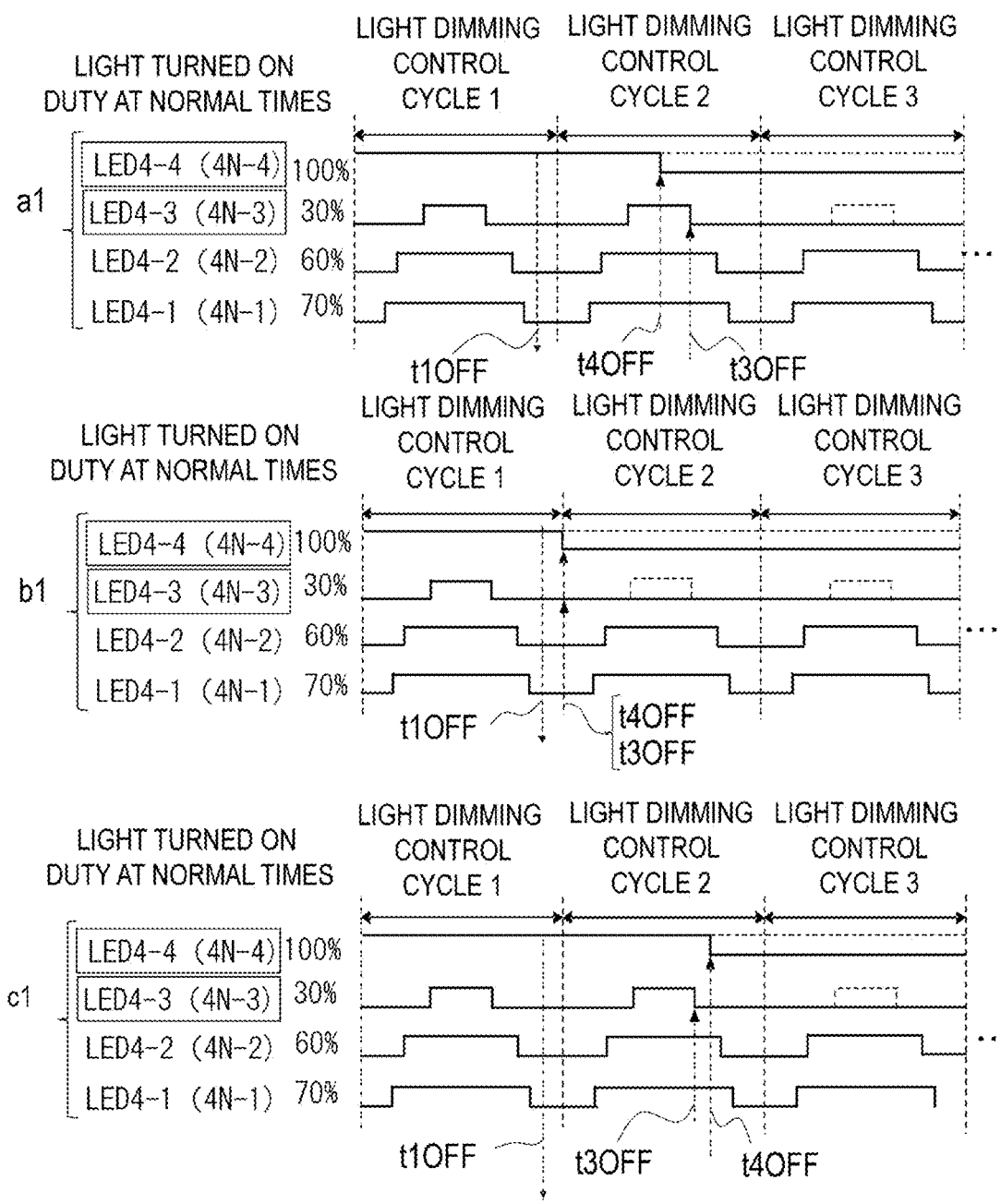
FIG. 19 is a first operation explanatory diagram, according to the Embodiment 8.
Figure 20:
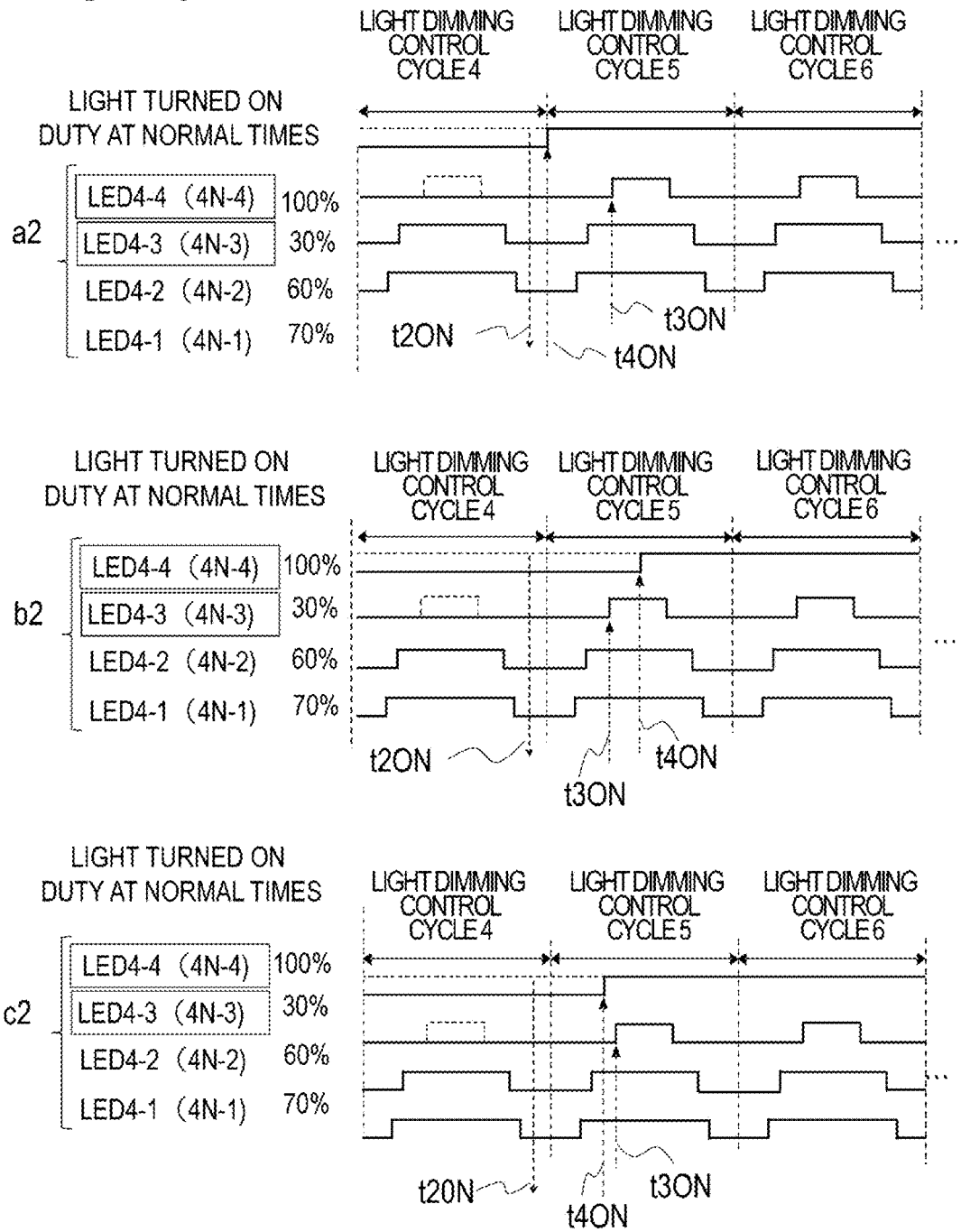
FIG. 20 is a second operation explanatory diagram, according to the Embodiment 8.

FIG. 19 and FIG. 20 are explanatory diagrams of the control example according to the Embodiment 8. FIG. 19 illustrates about the control, when the controller 3 receives a "light turned off indicating signal of a specific light source" from an external ECU. Moreover, FIG. 20 illustrates about the control, when the controller 3 receives a "light turned on (adjusting the amount of light) return indicating signal of a specific light source" from the external ECU.

FIG. 19 and FIG. 20 both illustrate a case in which the number of LED light sources is four (m=4), in the light source unit which is shown in FIG. 1, or in any light source unit among a plurality of light source units which is shown in FIG. 10. Moreover, in FIG. 19 and FIG. 20, illustrated is a case in which respective light turned on duty ratios of the four LED light sources at normal times are set to be 100%, 30%, 60%, and 70%. In addition, those LED light sources are sequentially light turned on from the one with a larger light turned on duty ratio, and furthermore, sequentially light turned off from the one with a smaller light turned on duty ratio. Under those situations, in the light dimming control cycle of LED light sources, the light dimming control starts from the state in which the simultaneously light turned on number of LED light sources is zero. According to the Embodiment 8, like in the Embodiment 7, the notation of LED 4N-m in a plurality of light source units is omitted, and henceforth, the notation of LED 4-$m$ in a single light source unit is indicated as a representative.

The light dimming control cycle 1 which is illustrated in FIG. 19 is assumed to be in the mentioned above light dimming control state at normal times. Although not illustrated, it is assumed that, for example, when the drive of a light source unit concerned is in on state, by the light source drive control switch which controls the on and off drive of a light source unit, the state of the light dimming control cycle 1 may be repeated at normal times for every light dimming cycle.

On the way of the light dimming control cycle 1 which is shown in FIG. 19, the controller 3 receives the mentioned above "light turned off indicating signal of a specific light source" at time t1OFF. In addition, it is assumed that, as to two of the LED light source 4-3 and the LED light source 4-4, among the four LED light sources, this signal has the content to indicate the light turned off, from the light dimming control cycle 2, which is a subsequent light dimming control cycle. Here, the light turned on duty ratios, at normal times of the LED light source 4-3 and the LED light source 4-4, are assumed to be 30% and 100%, respectively.

With regard to the LED light source 4-3 whose light turned on duty ratio at normal times is 30%, as illustrated in (a1) and (c1) of FIG. 19, in the light dimming control cycle 2, the light source is light turned off at the light turned off timing (in the drawing, at time t3OFF) of the light dimming control at normal times. In addition, until receiving a light turned on (adjusting the amount of light) return signal, the light turned off state is maintained on and after the subsequent light dimming control cycle 3. Or, as illustrated in (b1) of FIG. 19, when the simultaneously turned on number of LED light sources at the start time of the light dimming control cycle is zero, it is allowed to maintain the LED light source 4-3 to be in the light turned off state, from the start time (in the drawing, at time t3OFF) of the light dimming control cycle 2. By employing the configuration mentioned above, when the light source device receives a signal for light turning off a specific LED light source, whose light turned on duty ratio at normal times is other than 100%, it becomes easy to prevent the overlapping between the light turned off timing of a specific LED light source concerned and the light turned off timings of other LED light sources on which light dimming control is continued. In addition, it becomes possible, without restraining a pattern in luminous intensity distribution, to maintain the stable light turned on, where light turned off is prevented, regarding light sources other than a specific light source, which becomes a target for the light turned off.

With regard to the LED light source 4-4 whose light turned on duty ratio at normal times is 100%, as illustrated in (a1) of FIG. 19, in the light dimming control cycle 2, the light source is light turned off, during the period when the simultaneously light turned on number of LED light sources at normal times becomes the largest, and furthermore, at the timing (in the drawing, at time t4OFF) not overlapping with the light turned off timings of other light sources. In addition, the light source device maintains a light turned off state on and after the subsequent light dimming control cycle 3, until it receives a light turned on (adjusting the amount of light) return signal.

Or, as illustrated in (b1) of FIG. 19, in the light dimming control cycle 2, it is allowed to light turn off, during a period when the simultaneously turned on number of LED light sources at normal times becomes the smallest, and furthermore, at the timing not overlapping with the light turned off timings of other light sources. Since a case is illustrated, in (b1) of FIG. 19, where the number of simultaneously turned on LED light sources at the start time of the light dimming control cycle is zero, the light source device turns off the LED light source 4-4 at a start time t4OFF of the light dimming control cycle 2, and the light turned off is maintained.

Or, as illustrated in (c1) of FIG. 19, in the light dimming control cycle 2, it is allowed to turn off the light source, during a transition period from a state in which the simultaneously turned on number of LED light sources is the largest to a state in which the number is the smallest, and furthermore, at the timing (in the drawing, at time t4OFF) not overlapping with the turned off timings of other LED light sources.

By employing the configuration mentioned above, when the light source device receives a signal for light turning off a specific LED light source whose light turned on duty ratio at normal times is 100%, it becomes possible to easily prevent the overlapping between the light turned off timing of a specific LED light source concerned, and the light turned off timings of other LED light sources on which light dimming control is continued. In addition, it becomes possible to maintain the state in which a plurality of LED light sources is sequentially light turned on from the one with a larger light turned on duty ratio, and furthermore, sequentially light turned off from the one with a smaller light turned on duty ratio. Therefore, with regard to light sources other than a specific light source which becomes a target for light turning off, it is possible, without restraining a pattern in luminous intensity distribution, to achieve and maintain the stable light turned on, where light turned off is prevented.

It is worth noticing that, a case is considered in which a specific LED light source whose light turned on duty ratio at normal times is 100% is light turned off. Under this situation, when it is possible to prevent the output voltage value Vo2 of the mentioned above electric power unit 2 from falling to a value lower than m×Vf, it is allowed to set the light turned off timing, at following exceptional timings: for example, the light turned on timing at the light dimming time of other LED light sources, and during a transition period from a state in which the simultaneously turned on number of LED light sources is the smallest, to a state in which the number is the largest.

Next, it is assumed that the light dimming control cycle 4, which is illustrated in FIG. 20, is the state in which the light turned off state of two LED light sources of the LED light source 4-3 and the LED light source 4-4 is continued, based on the mentioned above "light turned off indicating signal of a specific light source." Although not illustrated, it is assumed that, until the light source device receives from an external ECU, a "light turned on (adjusting the amount of light) return signal of a specific light source" and a "light turned off indicating signal of a specific light source" over other LED light sources which become newly objects concerned, the state of the light dimming control cycle 3 or 4 will be repeated for every light dimming cycle, during the time between from the light dimming control cycle 3 of FIG. 19 to the light dimming control cycle 4 of FIG. 20.

On the way of the light dimming control cycle 4 which is shown in FIG. 20, the controller 3 receives the mentioned above "light turned on (adjusting the amount of light) return indicating signal of a specific light source" at time t2ON. In addition, it is assumed that, regarding the two of the LED light source 4-3 and the LED light source 4-4 among the four LED light sources, the received signal has the content to indicate the return of light turned on (adjusting the amount of light), from the light dimming control cycle 5, which is the subsequent light dimming control cycle. Here, as illustrated in FIG. 19, it is assumed that, after the LED light source 4-3 and the LED light source 4-4 have returned (at normal times), their light turned on duty ratios are 30% and 100%, respectively.

Regarding the LED light source 4-3 whose light turned on duty ratio at normal times is 30%, as illustrated in (a2) to (c2) of FIG. 20, at the light dimming control cycle 5, the light source is light re-turned on at the light turned on timing (in the drawing, at time t3ON) of the light dimming control at normal times, and drives at a light turned on duty ratio of 30%. Moreover, until the light source unit receives a "light turned off indicating signal of the LED light source 4-3" again, the light dimming at normal times, with the light turned on duty ratio of 30%, is maintained on and after the subsequent light dimming control cycle 6.

By employing the configuration mentioned above, when the light source device receives the light turned on (adjusting the amount of light) return signal of a specific LED light source, with the light turned on duty ratio at normal times other than 100%, it becomes possible to easily prevent the overlapping between the light turned on (adjusting the amount of light) return signal of a specific LED light source concerned and the light turned on timings of other LED light sources on which light dimming control is continued. In addition, it becomes possible, without restraining a pattern in luminous intensity distribution, to achieve and maintain the stable light turned on, where light turned off is prevented.

Regarding the LED light source 4-4, whose light turned on duty ratio at normal times is 100%, as illustrated in (a2) of FIG. 20, in the light dimming control cycle 5, the light source is light re-turned on, during a period when the simultaneously turned on number of LED light sources at normal times is the smallest, and furthermore, at the timing (in the drawing, at time t4ON) not overlapping with the light turned on timings of other LED light sources.

In FIG. 20 (a2), a case is illustrated, in which the simultaneously light turned on number of LED light sources at the start time of the light dimming control cycle is zero, and then the LED light source 4-4 is light re-turned on at the start time (in the drawing, at time t4ON) of the light dimming control cycle 5, and the light turned on is maintained. Moreover, until the light source unit receives again a "light turned off indicating signal of the LED light source 4-4," the light dimming at normal times with a light turned on duty ratio of 100% is maintained on and after the subsequent light dimming control cycle 6.

Or, as illustrated in (b2) of FIG. 20, in the light dimming control cycle 5, it is allowed that the light source is light re-turned on, during a period when the simultaneously light turned on number of LED light sources at normal times is the largest, and furthermore, at the timing (in the drawing, at time t4ON) not overlapping with the light turned on timings of other light sources.

Or, as illustrated in (c2) of FIG. 20, in the light dimming control cycle 5, it is allowed to light re-turn on, during a transition period from a state in which the simultaneously light turned on number of LED light sources at normal times is the smallest, to a state in which the number is the largest, and furthermore, at the timing (in the drawing, at time t4ON) not overlapping with the light turned on timings of other LED light sources.

By employing the configuration mentioned above, when the light source unit receives a return signal for light turned on of a specific LED light source, with a light turned on duty ratio of 100% at normal times, it becomes possible to easily prevent the overlapping between the light re-turned on timing of a specific LED light source concerned and the light turned on timings of other LED light sources on which light dimming control is continued. In addition, the light source unit can maintain the state in which respective LED light sources are sequentially light turned on from the one with a larger light turned on duty ratio, and furthermore, sequentially light turned off from the one with a smaller light turned on duty ratio. Therefore, it becomes possible, without restraining a pattern in luminous intensity distribution, to achieve and maintain the stable light turned on, where light turned off is prevented.

It is worth noticing that, a case is considered in which a specific LED light source with a light turned on duty ratio of 100% at normal times is light re-turned on. Under this situation, when the output voltage value Vo2 of the mentioned above electric power unit 2 can be prevented from falling to a value lower than m×Vf, it is allowed to set the light re-turned on timing to be following exceptional timings: for example, the light turned off timing at the light dimming time of other LED light sources, or during a transition period from a state in which the simultaneously turned on number of LED light sources is the largest, to a state in which the number is the smallest.

From the descriptions mentioned above, in the case where at least two LED light sources are controlled at each different light turned on duty ratio, and also when the light source unit performs, at the detection time of an oncoming car or the like, the light turned off of a specific light source or the return of light turned on (adjusting the amount of light) of a specific light source, it becomes possible, without restraining a pattern in luminous intensity distribution, to achieve the coexistence with stable light turned on, where the light turned off of other LED light sources is prevented.

According to the mentioned above Embodiments of the present application, explanation is made focusing on the case of a car, as an example. Their suitable scope is, however, not limited to the mentioned above usage, and those embodiments can be applied also to, for example, light source devices, like ceiling lights or street lights, and other equipment using LED light sources.

Moreover, according to the mentioned above Embodiments, explanation is made focusing on the cases in which LED light sources are employed as the light source. Light sources of luminescence which are controlled by electric power, can be, however, applied similarly.

Figure 21:
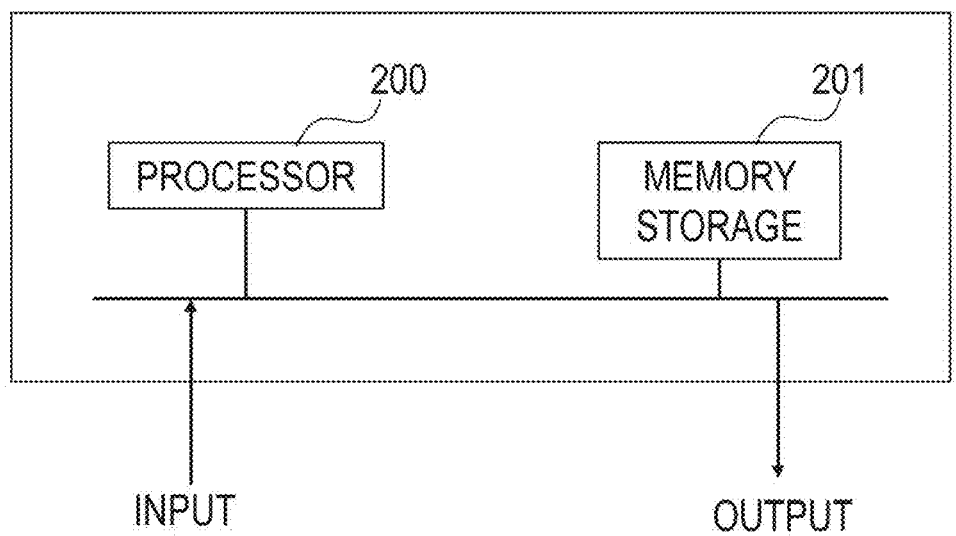
FIG. 21 is a configuration diagram for showing the hardware constitution of the control means, which is used in the Embodiments.

It is worth noticing that, the controller, the switch control circuit, the boost controller, and the step-down controller, which are all explained in the Embodiments, consist of processors 200 and memory storages 201, as an example of their hardware is shown in FIG. 21. Although memory storages are not illustrated, the light source device is provided with volatile storages, such as a random access memory, and non-volatile auxiliary storage units, such as a flash memory. Moreover, instead of a flash memory, the light source device may be provided with the auxiliary storage unit of hard disk type. The processor 200 runs a program which is input from the memory storage 201. In this case, the program is input into the processor 200 through volatile storages from an auxiliary storage unit. Moreover, the processor 200 may output data of operation results and others to the volatile storages of the memory storage 201, and may save the data through volatile storages in the auxiliary storage unit. Moreover, the processor 200 may be the microcomputer which is combined with peripheral circumference circuits.

Furthermore, the controller, the switch control circuit, the boost controller, and the step-down controller, which are all explained in the Embodiments, may consist of digital circuits, such as FPGA (Field Programmable Gate Array) and CPLD (Complex Programable Logic Device). In addition, the boost controller and the step-down controller may consist of analog circuits, containing operational amplifiers, comparators, resistors, capacitors, and the like. Or, the controller, the switch control circuit, the boost controller, and the step-down controller, may have the configuration in which the processor 200 or peripheral circumference circuits, FPGA, and analog circuits, which are all mentioned above, are provided in a mixed manner, and may have the configuration in which DSP (Digital Signal Processor) in a parallel bus architecture is mounted.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Input Voltage Source: 2 Electric Power Unit: 3 Controller, 4 LED Light Source: 5 Switch: 6 Switch Control Circuit: 7 Light Source Drive Circuit: 8 Light Source Unit: 100 Light Source Device: 200 Processor: 201 Memory Storage

What is claimed is:

1. A light source device comprising:
    an electric power supply which outputs a voltage with a predetermined value in response to an output of an external power supply, and
    at least one light source equipment, wherein
    the at least one light source equipment comprises:
        light sources which are series connected,
        switches which are each connected in parallel with each of the light sources,
        a light source drive circuit which supplies a current to a structure including the light sources and the switches in response to output electric power from the electric power supply, and
        a switch control circuit which carries out on and off control of the switches,
    the at least one light source equipment carries out light dimming control of the light sources by performing on and off control of the switches according to a light turned on duty ratio,
    at least two of the light sources have a mutually different light turned on duty ratio, and
    each of the light sources of the at least one light source equipment is sequentially light turned on from the one with a larger light turned on duty ratio to the one with a smaller light turned on duty ratio, and in addition, sequentially light turned off from the one with the smaller light turned on duty ratio to the one with the larger light turned on duty ratio.

2. The light source device as claimed in claim 1, further comprising a controller which outputs a switch control signal based on light source control information,
    wherein the switch control circuit carries out the on and off control of each of the switches based on the switch control signal of the controller.

3. The light source device as claimed in claim 2, wherein the at least one light source equipment includes a plurality of light source equipment.

4. The light source device as claimed in claim 3, wherein
    in at least one of the plurality of light source equipment, the light dimming control starts from a period when a simultaneously light turned on number of the light sources becomes the largest, and
    in at least one of the others among the plurality of light source equipment, the light dimming control starts from a period when a simultaneously light turned on number of the light sources becomes the smallest.

5. The light source device as claimed in claim 3,
    wherein, in at least one light source equipment among the plurality of light source equipment, each of the light turned on duty ratios of the light sources is the same with each of the light turned on duty ratios of the light sources in at least one light source equipment of the others among the plurality of light source equipment.

6. The light source device as claimed in claim 1, wherein, in the at least one light source equipment, the light dimming control starts from a period when a simultaneously light turned on number of the light sources becomes the largest.

7. The light source device as claimed in claim 1, wherein, in the at least one light source equipment, at least either one of:
    a period from a light turned off timing of any light source among the light sources to a light turned off timing of another light source to be turned off in the next place, and
    a period from a light turned off timing of a light source to be turned off in the last place to a light turned on timing of a light source to be turned on in the next place
    is shorter than a reciprocal time of an upper limit frequency at a response frequency band of the electric power supply.

8. The light source device as claimed in claim 1, wherein, in a case where, among the light sources in the at least one light source equipment, the light dimming is performed on at least two light sources at the same light turned on duty ratio:
    in a state where light turned on timings do not overlap each other, each light turned on timing is set between the light turned on timing of a light source with a next larger light turned on duty ratio and the light turned on timing of a light source with a next smaller light turned on duty ratio, or
    in a state where light turned off timings do not overlap each other, each light turned off timing is set between the light turned off timing of a light source with a next larger light turned on duty ratio and the light turned off timing of a light source with a next smaller light turned on duty ratio.

9. The light source device as claimed in claim 1, wherein, in a case where a specific light source among the light sources, in the at least one light source equipment is light turned off:
    when the light turned on duty ratio of a light source concerned, the ratio being before the light turned off, is 100%, the light source concerned is light turned off during a period when a simultaneously light turned on number of light sources in the light source equipment, in which the light source concerned is contained, is the smallest; during a period when the number is the largest; or during a transition period from a state in which a simultaneously light turned on number is the largest, to a state in which the number is the smallest, and furthermore, at a timing not overlapping with turned off timings of other light sources in the light source equipment concerned, and when the light turned on duty ratio of a light source concerned, the ratio being before the light turned off, is other than 100%, the light source concerned is light turned off at the light turned off timing in the light dimming control and the light turned off state is maintained.

10. The light source device as claimed in claim 9, wherein, in a case where a light turned off state of a specific light source concerned returns to a light turned on state:

when the light turned on duty ratio of the light source concerned, the ratio being before the light turned off, is 100%, the light source concerned returns to the light turned on during a period when a simultaneously light turned on number of the light sources in the light source equipment, in which the light source concerned is contained, is the smallest; during a period when the number is the largest; or during a transition period from a state in which the simultaneously light turned on number is the smallest, to a state in which the number is the largest, and furthermore, at the timing not overlapping with the light turned on timings of the other light sources in the light source equipment concerned, and when the light turned on duty ratio of the light source concerned, the ratio being before the light turned off, is other than 100%, the light source concerned returns to the light turned on at the light turned on timing in the light dimming control and the light dimming at a predetermined light turned on duty ratio is maintained.

11. A method comprising:

carrying out light dimming control of a plurality of light sources, which are series connected, by performing on and off control of switches, which are each connected in parallel with each of the light sources, according to a light turned on duty ratio, at least two of the light sources having a mutually different light turned on duty ratio; and sequentially light turning on each of the light sources from the one with a larger light turned on duty ratio to the one with a smaller light turned on duty ratio, and in addition, sequentially light turning off each of the light sources from the one with the smaller light turned on duty ratio to the one with the larger light turned on duty ratio.

\* \* \* \* \*